(12) United States Patent
Kobayashi

(10) Patent No.: US 11,508,038 B2
(45) Date of Patent: Nov. 22, 2022

(54) IMAGE PROCESSING METHOD, STORAGE MEDIUM, IMAGE PROCESSING APPARATUS, LEARNED MODEL MANUFACTURING METHOD, AND IMAGE PROCESSING SYSTEM

(71) Applicant: CANON KABUSHIKI KAISHA, Tokyo (JP)

(72) Inventor: Masakazu Kobayashi, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 177 days.

(21) Appl. No.: 17/028,104

(22) Filed: Sep. 22, 2020

(65) Prior Publication Data

US 2021/0097650 A1    Apr. 1, 2021

(30) Foreign Application Priority Data

Sep. 27, 2019 (JP) .............................. JP2019-178047

(51) Int. Cl.
*G06T 5/00* (2006.01)

(52) U.S. Cl.
CPC .... *G06T 5/002* (2013.01); *G06T 2207/20081* (2013.01)

(58) Field of Classification Search
CPC ........... G06T 5/002; G06T 2207/20081; G06T 5/006; G06T 5/003; G06T 2207/20084; G06T 5/20; G06T 5/00; G06T 5/50; G06T 7/55; G06T 2207/20172; G06T 40/161; G06N 3/0454; G06N 3/084; G06N 20/00; G06N 3/02; G06N 3/08–088; G06V 10/507; G06V 10/60; G06V 10/30; G06V 30/18095; G06V 30/18124; G06V 30/164; G06K 9/00; G06K 9/6256; G06K 9/6262; H04N 5/2621; H04N 5/23264; H04N 5/23267; H04N 5/23212; H04N 5/23229
See application file for complete search history.

(56) References Cited

U.S. PATENT DOCUMENTS

| | | | |
|---|---|---|---|
| 10,664,953 B1* | 5/2020 | Lanman | ................... G06T 5/002 |
| 10,740,876 B1* | 8/2020 | Lanman | ............... G02B 27/017 |
| 11,094,075 B1* | 8/2021 | Lanman | ................. G06N 3/084 |
| 2013/0271616 A1* | 10/2013 | Hirakawa | ............... G06T 5/003 348/208.6 |
| 2016/0048952 A1* | 2/2016 | Tezaur | ..................... G06T 5/004 382/255 |
| 2016/0371567 A1* | 12/2016 | Hiasa | ........................ G06T 5/00 |
| 2016/0371820 A1* | 12/2016 | Hiasa | ..................... G06T 7/207 |
| 2018/0061020 A1* | 3/2018 | Hiasa | ..................... G06T 5/003 |

(Continued)

FOREIGN PATENT DOCUMENTS

JP    2016220016 A    12/2016

*Primary Examiner* — Jose L Couso
(74) *Attorney, Agent, or Firm* — Rossi, Kimms & McDowell LLP

(57) ABSTRACT

An image processing method for generating an estimated image in which a defocus blur shape in a captured image is corrected includes a first step of acquiring input data including the captured image and shape designating information that designates a defocus blur shape in the estimated image, and a second step of inputting the input data to a machine learning model and of generating the estimated image.

19 Claims, 19 Drawing Sheets

(56) References Cited

U.S. PATENT DOCUMENTS

| | | | |
|---|---|---|---|
| 2020/0065942 A1* | 2/2020 | Hiasa | G06T 5/50 |
| 2020/0285883 A1* | 9/2020 | Hiasa | G06K 9/6257 |
| 2020/0311881 A1* | 10/2020 | Lanman | G06T 7/11 |
| 2020/0388014 A1* | 12/2020 | Hiasa | G06N 20/00 |

* cited by examiner

IMAGE PROCESSING METHOD, STORAGE MEDIUM, IMAGE PROCESSING APPARATUS, LEARNED MODEL MANUFACTURING METHOD, AND IMAGE PROCESSING SYSTEM

BACKGROUND OF THE INVENTION

Field of the Invention

The present invention relates to an image processing method for obtaining a good image by shaping blurs caused by defocus in a captured image.

Description of the Related Art

Japanese Patent Laid-Open No. ("JP") 2016-220016 discloses a method that corrects a blur shape caused by defocus (defocus blur or defocus bokeh), and includes dividing a pupil in an optical system into a plurality of parts, capturing a plurality of parallax images obtained by observing an object space from each divided pupil, and adjusting weights used to combine the plurality of parallax images.

However, the method disclosed in JP 2016-220016 cannot reproduce defocus blurs corresponding to a pupil larger than the pupil in the optical system, because this method adjusts a weight of each divided pupil and combines a plurality of parallax images. In other word, this method cannot fill defocus blur defects caused by vignetting. When the weights for combining the plurality of parallax images become nonuniform, noises increase. Since two-line blurs and the like have fine structures, it is necessary to divide the pupil in the optical system into finer parts in order to reduce their influences. Then, the spatial resolution of each parallax image lowers or noises increase.

Defocus blur shapes can be corrected with a machine learning model, such as CNN (Convolutional Neural Network). Due to individual preferences of users of the defocus blur shape, it is necessary to learn defocus blurs having various shapes as ground truth images. However, when there are a plurality of ground truth images corresponding to a single training image for some cases, it is difficult to learn learning data when with only a weight in one machine learning model. Then, even when the captured image is input to the learned CNN, an average of various defocus blur shapes that are ground truth images may be output as an estimated image. This is because the CNN learns a plurality of ground truth images on average. If different weights are learned for each defocus blur shape as the ground truth image, the learning load and a stored data amount would increase.

SUMMARY OF THE INVENTION

The present invention provides an image processing method and the like, each of which can correct a defocus blur shape in a captured image into various shapes while suppressing increases of a learning load and a stored data amount for a machine learning model.

An image processing method according to one aspect of the present invention for generating an estimated image in which a defocus blur shape in a captured image is corrected includes a first step of acquiring input data including the captured image and shape designating information that designates a defocus blur shape in the estimated image, and a second step of inputting the input data to a machine learning model and of generating the estimated image.

A non-transitory computer-readable storage medium storing a program that execute a computer to execute the above image processing method also constitutes another aspect of the present invention. An image processing apparatus corresponding to the above image processing method also constitutes another aspect of the present invention.

A learned model manufacturing method according to another aspect of the present invention includes the steps of acquiring a training image and a ground truth image having different blur shapes for the same object, acquiring shape designating information for designating the defocus blur shape of the ground truth image, and learning at a machine learning model based on the training image, the ground truth image, and the shape designating information. An image processing apparatus corresponding to the above image processing method also constitutes another aspect of the present invention.

An image processing system according to another aspect of the present invention includes a first apparatus and a second apparatus that communicate with each other. The first apparatus includes a transmitter configured to transmit to the second apparatus a request for a processing execution for a captured image. The second apparatus includes a receiver configured to receive the request, an acquirer configured to acquire input data including the captured image and shape designating information for designating a defocus blur shape of an estimated image, and a generator configured to input, according to the request, the input data to a machine learning model and to generate the estimated image in which the defocus blur shape of the captured image is corrected.

Further features of the present invention will become apparent from the following description of exemplary embodiments with reference to the attached drawings.

DESCRIPTION OF THE EMBODIMENTS

Figure 1:
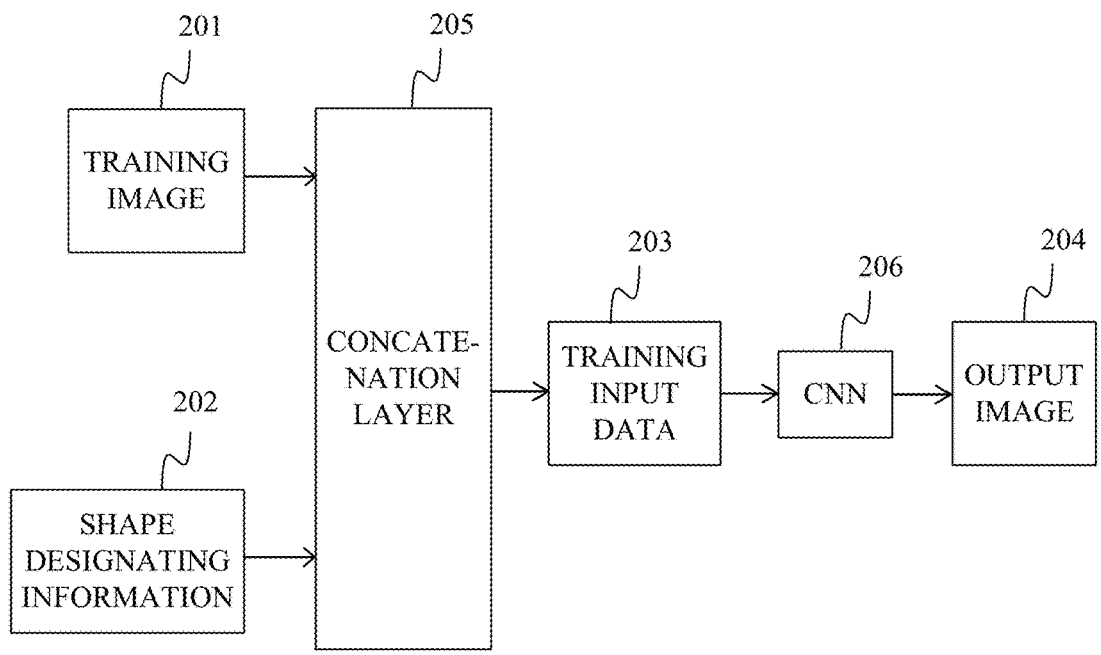
FIG. 1 illustrates a configuration of a machine learning model according to a first embodiment.

Referring now to the accompanying drawings, a detailed description will be given of embodiments according to the present invention. Corresponding elements in respective figures will be designated by the same reference numerals, and a duplicate description thereof will be omitted.

Before the embodiments are specifically described, the gist of the present invention will be described. The present invention reshapes defocus blurs in a captured image using a machine learning model. The machine learning model includes, for example, neural networks, genetic programming, Bayesian networks, and the like. The neural network includes CNN, GAN (General Adversary Network), RNN (Recurrent Neural Network), and the like. The defocus blur shaping refers to reshaping the defocus blur form or shape without restoring a frequency component. For example, reshaping from two-line defocus blur to Gaussian defocus blur or round defocus blur etc. is included. Details of various defocus blur shapes will be described later. Other defocus blurs to be corrected include, for example, defocus blur defects by vignetting and annular defocus blurs caused by pupil shielding such as a catadioptric lens. The present invention does not limit a target defocus blur shape or a corrected defocus blur shape.

Next follows a description of a difference from a defocus blur addition performed on smartphones. A smartphone with a wide-angle lens and a small sensor size is hard to create defocus blurs. Therefore, defocus blurs are added to create desired defocus blurs. On the other hand, the defocus blur correction according to the present invention corrects an object that has already been defocused into one with a desired defocus blur. In other words, the present invention needs to apply a defocus blur that satisfies a difference between a pre-existing defocus blur and a desired defocus blur, and more sophisticated processing.

The input data input to the machine learning model includes a captured image and information (shape designating information) that designates the corrected defocus blur shape. The shape refers to at least one of the type and size of the defocus blur. In the learning at the machine learning model, by inputting the shape designating information together with the training image, the machine learning model can learn a plurality of ground truth images having different defocus blur shapes for a single training image. In other words, even if the ground truth image includes defocus blurs having various shapes, a weight for not creating an average shape of the defocus blurs, but a weight for creating a different shape for each defocus blur shape can be learned. Therefore, learning data including defocus blurs having various shapes can be collectively learned with high accuracy. As a result, the present invention can correct defocus blurs having various shapes according to users' preferences while suppressing a learning load and a stored data amount.

In the following, the stage of learning a weight for the machine learning model will be called a learning phase, and the stage of correcting the defocus blur shape using the machine learning model and the learned weights will be called an estimation phase.

First Embodiment

Figure 2:
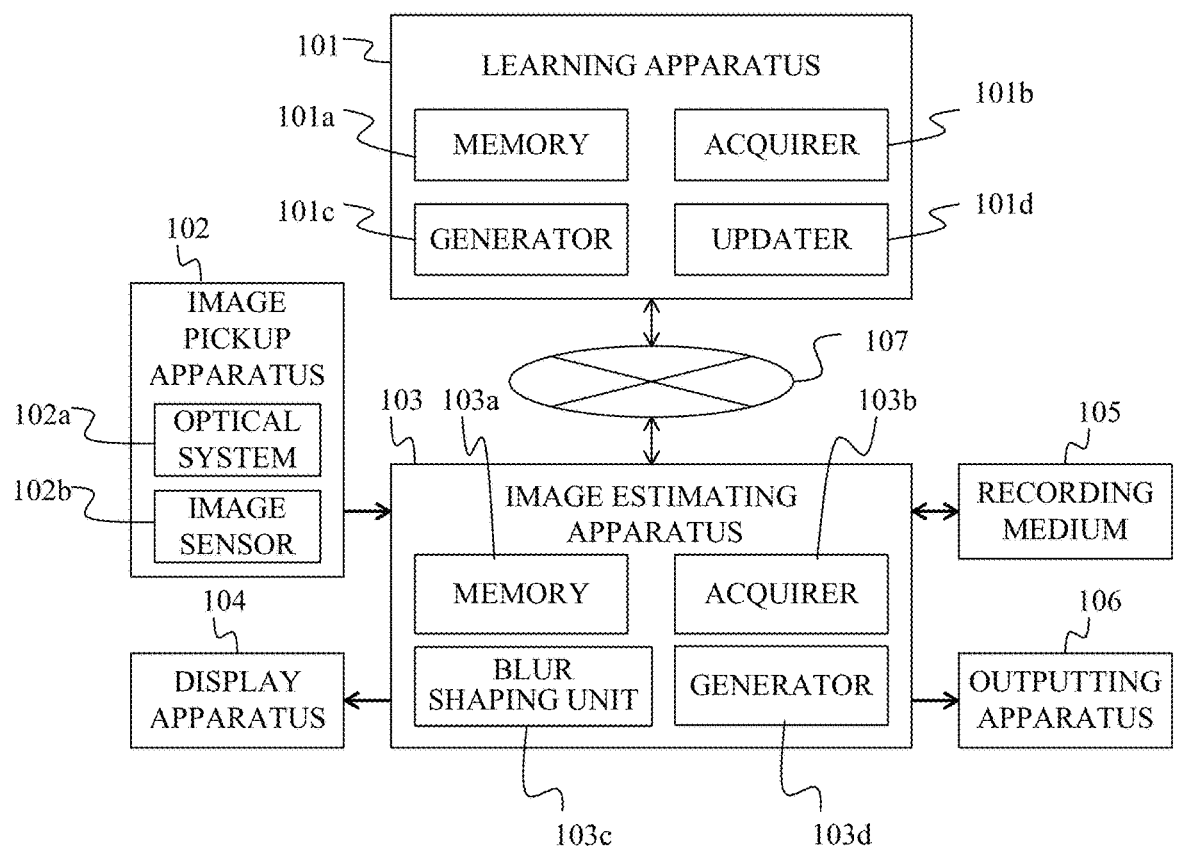
FIG. 2 is a block diagram of an image processing system according to the first embodiment.
Figure 3:
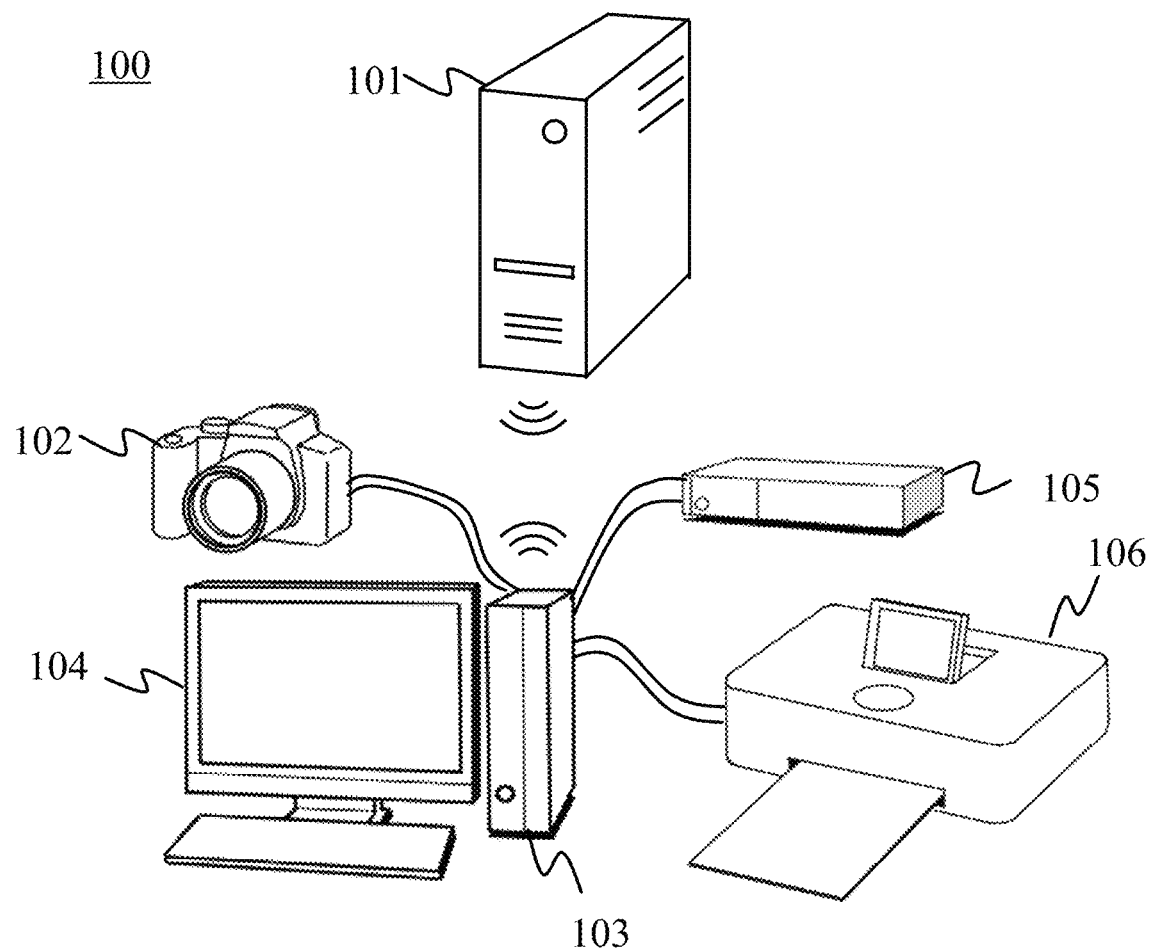
FIG. 3 is an external view of the image processing system according to the first embodiment.

Referring now to FIGS. 2 and 3, a description will be given of an image processing system according to a first embodiment of the present invention. FIG. 2 is a block diagram of an image processing system 100. FIG. 3 is an external view of the image processing system 100.

The image processing system 100 includes a learning apparatus 101, an image pickup apparatus 102, an image estimating apparatus 103, a display apparatus 104, a recording medium 105, an outputting apparatus 106, and a network 107. The learning apparatus 101 includes a memory 101a, an acquirer 101b, a generator 101c, and an updater 101d, and learns weights for a machine learning model used to correct defocus blurs (to manufacture a learned model). Details of weight learning and defocus blurs correcting processing using the weights will be described later.

The image pickup apparatus 102 has an optical system 102a and an image sensor 102b, and captures an image of an object space to acquire a captured image. The optical system 102a collects light incident from the object space and forms an optical image (object image). The image sensor 102b acquires the captured image by photoelectrically converting the optical image. The image sensor 102b is, for example, a CCD (Charge Coupled Device) sensor and a CMOS (Complementary Metal-Oxide Semiconductor) sensor.

The image estimating apparatus (image processing apparatus) 103 includes a memory 103a, an acquirer 103b, a blur shaping unit (blur shape corrector or generator) 103c, and a generator 103d. The image estimating apparatus 103 generates an estimated image in which a defocus blur shape is corrected for (at least part of) the captured image captured by the image pickup apparatus 102. For defocus blur corrections, a machine learning model using weights that have been learned by the learning apparatus 101 is used. The learning apparatus 101 and the image estimating apparatus 103 are connected by the network 107, and the image estimating apparatus 103 reads out the learned weight information from the learning apparatus 101 before or during the defocus blur correction. The estimated image is output to at least one of the display apparatus 104, the recording medium 105, and the outputting apparatus 106.

The display apparatus 104 is, for example, a liquid crystal display or a projector. The user can perform editing or the like while checking the image that is being processed via the display apparatus 104. The details of the user interface during editing will be described later. The recording medium 105 is, for example, a semiconductor memory, a hard disk drive, a server on a network, or the like, and stores the estimated image. The outputting apparatus 106 is a printer or the like.

Figure 4:
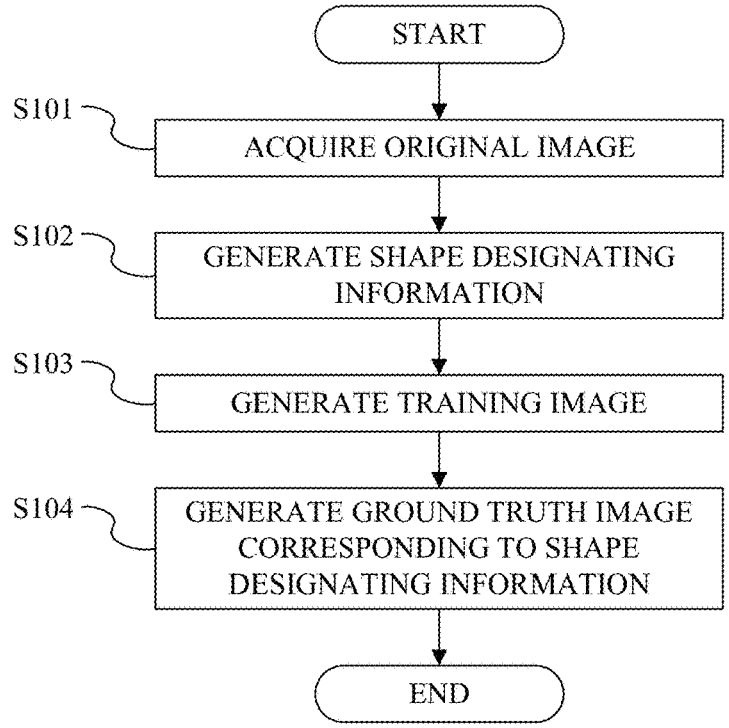
FIG. 4 is a flowchart for a learning data generating method according to the first to fourth embodiments.

Referring now to FIG. 4, a description will be given of generating the learning data executed by the learning apparatus 101. FIG. 4 is a flowchart for a learning data generation method. Each step in FIG. 4 is mainly executed by each unit in the learning apparatus 101. This embodiment uses CNN as the machine learning model, but may similarly apply another model.

First, in the step S101, the acquirer 101*b* acquires an original image. The number of original images may be one or more. The original image is an actually captured image, a CG (Computer Graphics) image, or the like. In the subsequent steps, a defocus blur is applied to the original image to create a training image and a ground truth image. Hence, the original image may include images having edges, textures, gradations, flat portions, etc. having various intensities and directions so as to correctly perform a shape conversion of a defocus blur for various objects.

The original image may have a signal value higher than a luminance saturation value of the image sensor 102*b*. This is because even when an image of an actual object is captured by the image pickup apparatus 102 under a specific exposure condition, some objects do not fall within the luminance saturation value. The ground truth image and the training image receive defocus blurs, and then are clipped by the luminance saturation value of the image sensor 102*b*. Thereby, an object that does not fall within the actual luminance saturation value can be reproduced.

Next, in the step S102, the generator (second acquirer) 101*c* generates (acquires) shape designating information (that designates the defocus blur shape of the ground truth image), and stores it in the memory 101*a*. The shape designating information designates at least one of the size and type of corrected defocus shape. The type means the difference in Gaussian blur, round blur, two-line blur, etc. due to a difference in the PSF (Point Spread Function) intensity distribution.

Figure 25A:
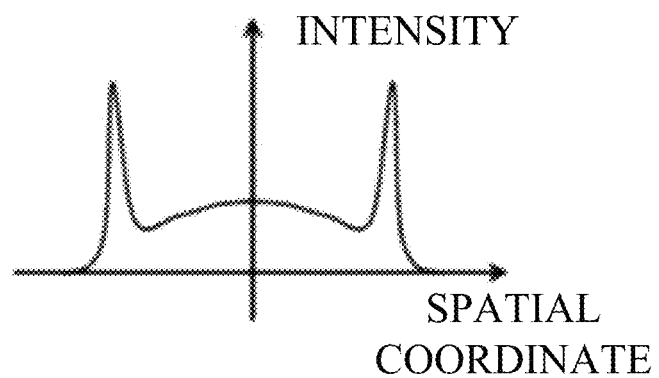
FIGS. 25A to 25C illustrate point spread functions (PSF) at a defocus distance according to each embodiment.
Figure 25B:
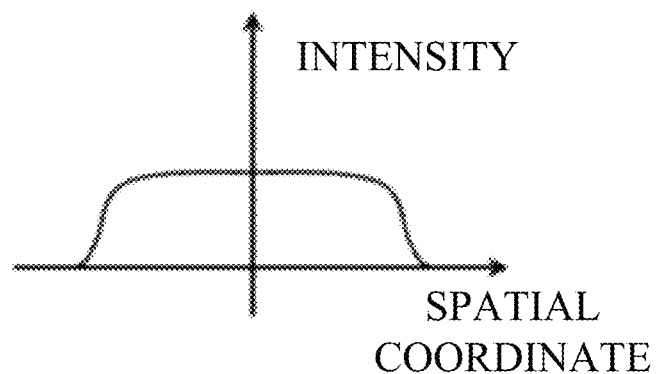
Figure 25C:
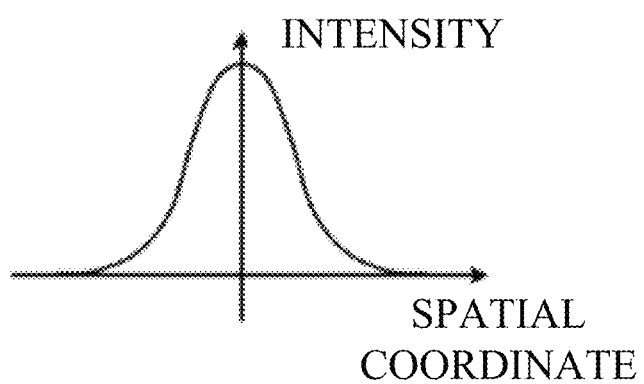

Referring now to FIGS. 25A to 25C, a description will be given of a two-line blur, a round blur, and a Gaussian blur. FIG. 25A illustrates a point spread function (PSF) of the two-line blur. In FIG. 25A, the abscissa axis represents a spatial coordinate (position) and an ordinate axis represents an intensity. This also applies to FIGS. 25B and 25C described later. As shown in FIG. 25A, the double-line blur has a PSF having separated peaks. When the PSF at the defocus distance has a shape as shown in FIG. 25A, an object that has originally a single line looks like double blurs due to defocus. FIG. 25B shows the PSF having the round blur. The round blur has a PSF with a flat intensity. FIG. 25C shows a PSF with the Gaussian blur. The Gaussian blur has a PSF with a Gaussian distribution. The size refers to a range in which PSF has an intensity.

Designating the size corresponds to virtually changing the F-number (aperture value) of the optical system 102*a*. When the F-number is changed, the size of the pupil of the optical system 102*a* is changed, so that the size of the defocus blur is changed. Image processing to correct the defocus blur can change the F-number to one that the optical system 102*a* cannot physically acquire from the captured image. Designating the type corresponds to virtually changing the optical system 102*a* to a different lens configuration. The type of the defocus blur, such as the two-line blur, the round blur, and the Gaussian blur, depend on the pupil function determined by the lens configuration of the optical system 102*a*. In other word, designating the size or type of the corrected defocus corresponds to designating virtual lens parameters. More specifically, designating the F-number corresponds to changing the spread of the pupil function. Further, designation the type such as the two-line blur and round blur corresponds to changing an amplitude or phase of the pupil function.

The shape designating information may be either a scalar or a map, but is a map in this embodiment. When the shape designating information is the scalar, the defocus blur shape cannot be designated for each area in the image. On the other hand, when the shape designating information is the map, it can be designated for each area in the image. Hence, the shape designating information may be the map. When the shape designating information is the map, the number of channels is one or more, the type and size of the defocus blur are indicated by numerical values, and the numerical values are normalized. For example, when the blur type is designated in the map having one channel, 0 may be set to the Gaussian blur and 1 may be set to the round blur. In designating it with a map having a plurality of channels, 1 may be set to an area for the Gaussian blur on the first channel, and 1 may be set to an area for the round blur on the second channel. When the blur size is designated by the map having one channel, 0 may be set to the size corresponding to F1.0 and 1 may be set to the size corresponding to F2.0. In designating it with a map having a plurality of channels, 1 may be set to an area for a size corresponding to F2.0 on the first channel and 1 may be set to an area for a size corresponding to F1.0 on the second channel.

A smoothing filter etc. may be applied to the shape designating information. Thereby, a boundary that specifies a different shape can be accurately corrected. The shape designating information generates a plurality of pieces of information designating a variety of defocus blur shapes. In this embodiment, a variety of defocus blur shapes are shapes selectable on a defocus blur shape designating tab 104*a* in FIG. 8 that illustrates the user interface.

Next, in the step S103 in FIG. 4, the generator 101*c* generates a training image and stores it in the memory 101*a*. The training image is an image obtained by applying a target defocus blur to the original image and by performing an imaging simulation. In order to deal with all captured images, defocus blurs corresponding to a variety of defocus amounts may be applied. The defocus blur can be applied by convolving the PSF with the original image or by taking a product of the frequency characteristic of the original image and the OTF (Optical Transfer Function). Images on the focal plane may not change before and after the defocus blur is corrected, so that a training image and a ground truth image in which the defocus blur is not applied are also generated.

Next, in the step S104, the generator 101*c* generates a plurality of ground truth images corresponding to plural shape designating information for a single training image, and stores them in the memory 101*a*. The ground truth image is an image obtained by applying the corrected defocus blur shape to the original image and by performing the imaging simulation. For the corrected defocus blur shape, a variety of patterns having different sizes and types corresponding to the shape designating information are prepared, such as the round blur corresponding to F2.0, and the Gaussian blur corresponding to F1.0. The ground truth image and the training image may be undeveloped RAW images or developed images. The order of generating the training image, the ground truth image, and the shape designating information may be exchanged.

An actually captured image taken by the optical system 102*a* and the image sensor 102*b* may be used to generate the learning data. For example, the training image is obtained using the optical system 102*a*. The ground truth image is obtained by capturing the same object as that for the training image using another imaging optical system having a defocus blur shape different from that of the optical system 102a. In other word, the training image and the ground truth image may have the same object and have different defocus blur shapes. In this case, a plurality of pieces of shape designating information are generated for different imaging optical systems having different defocus blur shapes from that of the optical system 102a, and have different numerical values. Partial areas having a predetermined number of pixels may be extracted from the training image and the ground truth image generated by the above two methods and used for learning. For the shape designating information, a partial area having the predetermined number of pixels may be extracted at the same timing as that of each of the training image and the ground truth image. Alternatively, after the partial areas having the predetermined number of pixels may be extracted from the training image and the ground truth image, and the partial area for the shape designating information may be generated.

Figure 5:
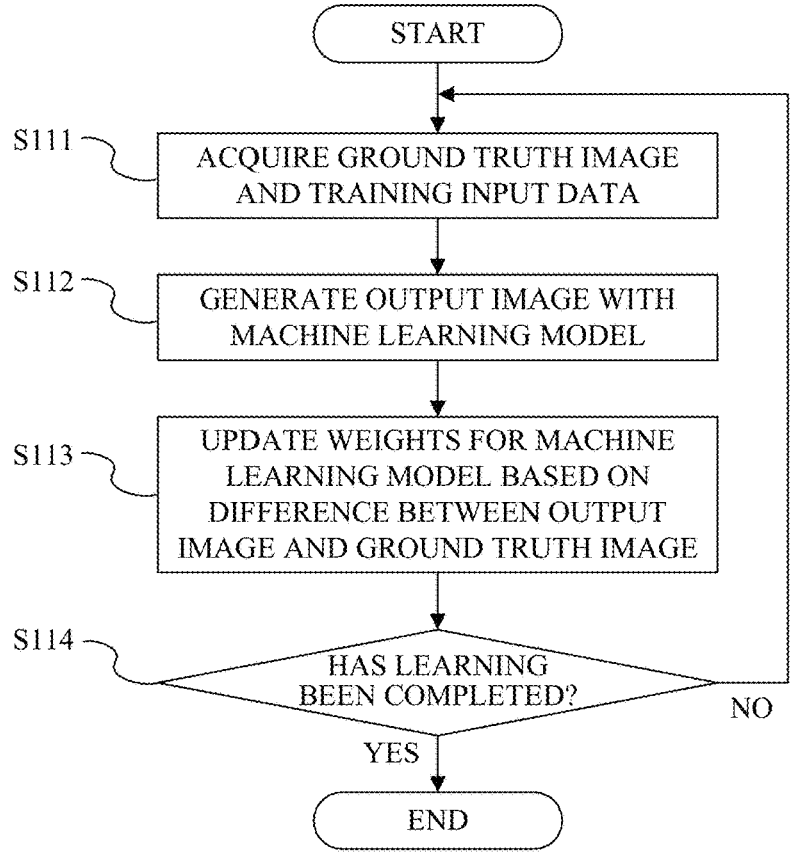
FIG. 5 is a flowchart for weight learning according to the first, third, and fourth embodiments.

Referring now to FIG. 5, a description will be given of weight learning (learning phase). FIG. 5 is a flowchart for the weight learning (learned model manufacturing method). Each step in FIG. 5 is mainly executed by each unit in the learning apparatus 101.

First, in the step S111, the acquirer 101b acquires one or more sets of ground truth image and training input data from the memory 101a. The training input data is input data in the CNN learning phase. The training input data includes a training image and shape designating information. A ground truth image having defocus blur corresponding to the shape designating information is selected and acquired from among the plurality of ground truth images.

Next, in the step S112, the generator 101c inputs the training input data to CNN and generates an output image. Referring now to FIG. 1, a description will be given of generating the output image in this embodiment. FIG. 1 illustrates a configuration of a machine learning model. The training input data includes a training image 201 and shape designating information 202. The training image 201 may be expressed by the gray scale or may have a plurality of channel components.

In this embodiment, a CNN (convolutional neural network) 206 has one or more convolutional layers or full concatenation layers. At the beginning of learning, the weight for the CNN 206 (each filter element and a bias value) is generated by a random number. A concatenation layer 205 concatenates the training image 201 and the shape designating information 202 in the channel direction in predetermined order. Other data may be concatenated between the training image 201 and the shape designating information 202. The CNN 206 inputs training input data 203 in which the training image 201 and the shape designating information 202 are concatenated, and generates an output image 204. When a plurality of sets of training input data have been acquired in the step S111, the output image 204 is generated for each set. Even for the same training image 201, the output image 204 differs depending on the shape designating information 202. There is no limitation on the position where the training image 201 or the shape designating information 202 is input to the network. The shape designating information 202 may be input after it is converted into a feature map by the subnetwork. For example, the shape designating information 202 may be converted into the feature map by the subnetwork and input from the middle layer of the CNN 206. If the shape designating information is a scalar, the scalar is converted into a feature map by the subnetwork, and then the same processing as that of the shape designating information 202 in FIG. 1 is performed.

Next, in the step S113 in FIG. 5, the updater 101d updates the weight for CNN from the error or difference between the output image and the ground truth image. This embodiment sets a Euclidean norm of the difference between the signal values of the output image and the ground truth image to a loss function. However, the loss function is not limited to this embodiment. When a plurality of sets of training input data and ground truth image are acquired in the step S111, a value of the loss function is calculated for each set. The weight is updated from the calculated value of the loss function by the back propagation method or the like.

Next, in the step S114, the updater 101d determines whether the weight learning is completed. The completion can be determined based on whether the number of learning (weight updating) iterations has reached a specified number, or whether a weight changing amount during updating is smaller than a specified value. If it is determined that the weight learning has not yet been completed, the flow returns to the step S111 to acquire one or more sets of new training input data and ground truth image. When it is determined that the weight learning has been completed, the learning is ended and the weight information is stored in the memory 101a.

Figure 8:
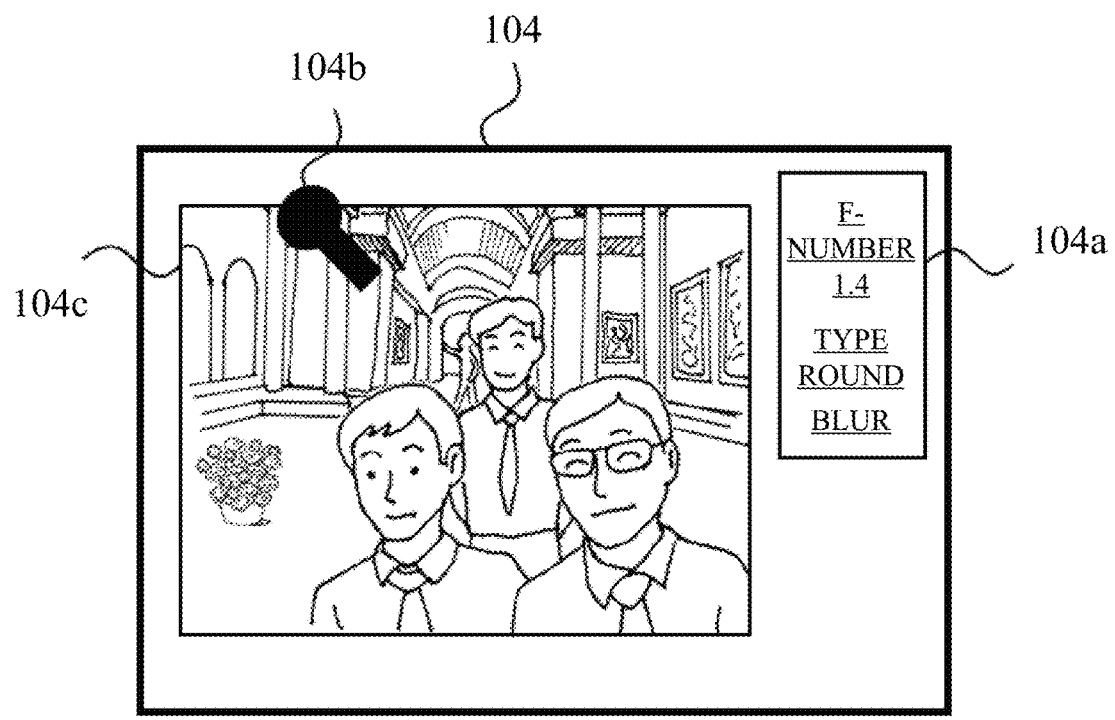
FIG. 8 illustrates a user interface according to the first embodiment.

Next follows a description of the defocus blur shape correction (estimation phase) of the captured image executed by the image estimating apparatus 103 and the user interface. In this embodiment, the user determines a replacement area, which is a defocus blur correcting area in the captured image. Then, the generator 103d replaces the replacement area with the estimated image, so as to generate an image in which the defocus blur in an arbitrary area designated by the user is corrected. As illustrated in FIG. 8, the display apparatus 104 displays the defocus blur shape designating tab 104a, a brush 104b, and a captured image 104c. The user can correct the defocus blur while confirming the display on the display apparatus 104.

Figure 6:
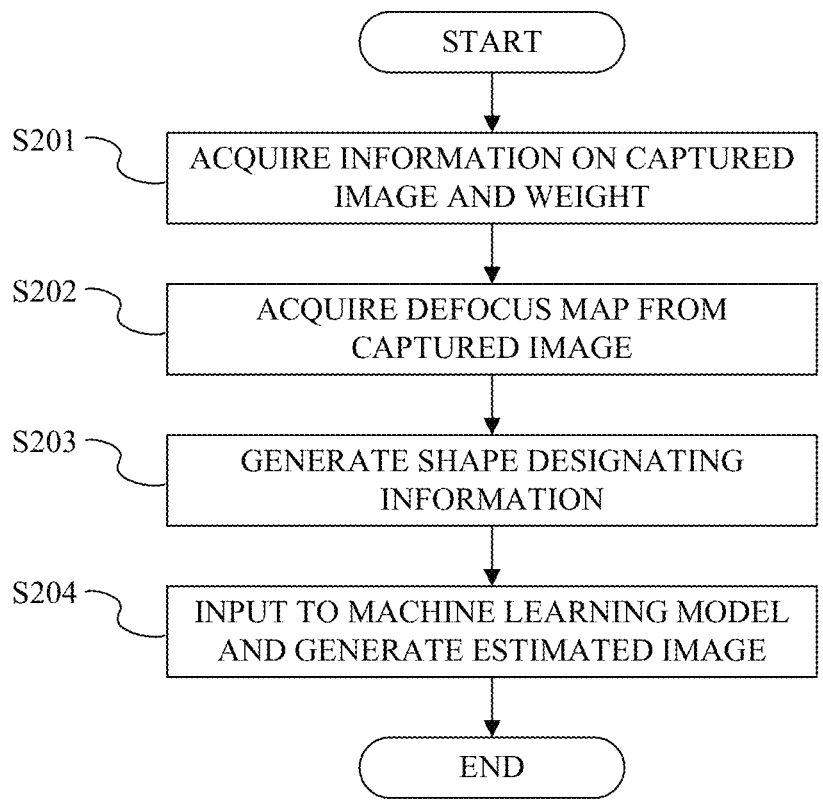
FIG. 6 is a flowchart for generating an estimated image according to the first embodiment.

Referring now to FIG. 6, a description will be given of generating the estimated image. FIG. 6 is a flowchart for generating the estimated image. Each step in FIG. 6 is mainly executed by each unit in the image estimating apparatus 103.

First, in the step S201, the acquirer 103b acquires the captured image and weight information. The captured image to be acquired may be part of the entire captured image. The weight information is read out of the memory 101a in advance and stored in the memory 103a.

Next, in the step S202, the acquirer 103b acquires the defocus map of the captured image. The defocus map is a map showing information on the defocus blur applied to the object in the captured image, and indicates the defocus amount of the object by a numerical value. The defocus map can be acquired by capturing a parallax image or using a DFD (Depth from Defocus). The defocus map has two main roles. The first role is to extract an object area mixed in the captured image by utilizing the fact that the defocus amount of each object is different and to use it for determining the replacement area. The second role is to input to the machine learning model for shape corrections with high accurate distinction between the object at the in-focus position and the defocus blur. This embodiment uses the former role or extracts the object area mixed in a captured image. The details of the latter will be described later.

Next, in the step S203, the generator 103d generates shape designating information corresponding to the shape selectable on the defocus blur shape designating tab 104a. In this embodiment, since the user specifies the replacement area, the shape designating information does not have a spatial distribution and may have the same value throughout the map.

Next, in the step S204, the blur shaping unit 103c inputs the input data to CNN and generates an estimated image. The input data includes a captured image and shape designating information that designates the defocus blur shape in the estimated image. The estimated image is an image in which the defocus blur shape in the captured image is corrected, and its shape is determined by the shape designating information. Similar to learning, the CNN 206 illustrated in FIG. 1 is used to generate the estimated image. In the CNN 206, the acquired learned weight is used. An estimated image is generated for each of a plurality of pieces of shape designating information corresponding to the defocus blurs selectable on the defocus blur shape designating tab 104a illustrated in FIG. 8. CNN uses the same weight for the first shape designating information for designating at least one of the size and type of the defocus blur and the second shape designating information for designating at least one of the size and type of the defocus blur different from the first shape designating information. The plurality of generated estimated images are stored in the memory 103a.

Figure 7:
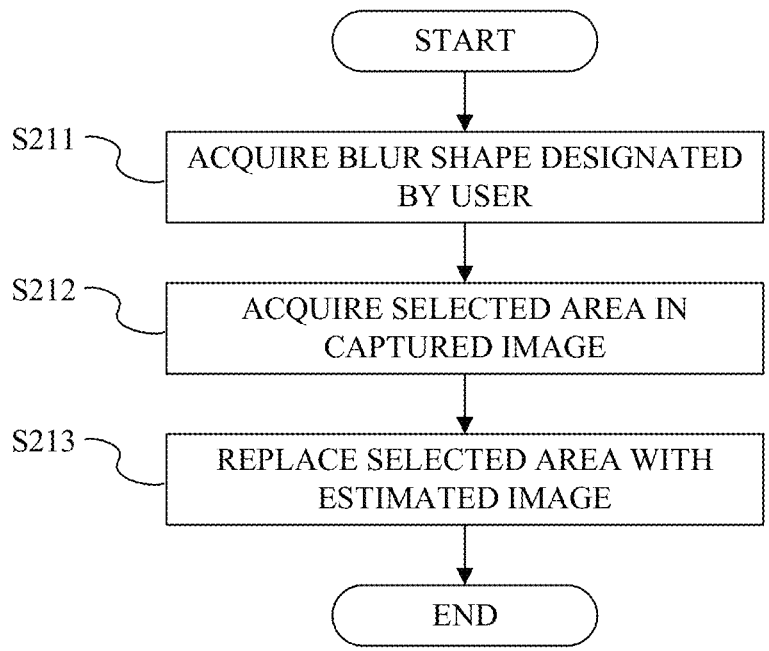
FIG. 7 is a flowchart for editing a captured image according to the first embodiment.

Referring now to FIGS. 7 and 8, a description will be given of editing the captured image by the user. FIG. 7 is a flowchart for editing the captured image. Each step in FIG. 7 is mainly executed by each unit in the image estimating apparatus 103.

First, in the step S211, the acquirer 103b acquires information for designating the corrected defocus blur shape designated by the user using the shape designating tab 104a illustrated in FIG. 8.

Next, in the step S212, the acquirer 103b acquires area information (replacement area) in the captured image 104c selected by the user using the brush 104b. This area is determined by the user pixel by pixel or based on the signal value distribution or the defocus map of the captured image from the area roughly selected by the user with the brush 104b. Relying on the signal value distribution or the defocus map of the captured image enables the target object area to be extracted. Relying on the signal value distribution of the captured image means to specify an area where the pixel value of the captured image discontinuously changes and to extract the object area.

Next, in the step S213, the generator 103d replaces the replacement area selected by the user with the estimated image having the designated defocus blur shape. As described above, this embodiment acquires the information on the replacement area for the captured image, and replaces the replacement area of the captured image with the estimated image. Thereby, the number of estimated image generations is smaller than that where the estimated image is generated whenever the replacement area is selected, and the defocus blur correction preferred by the user is available in a short time. The estimated image may use the one saved in the memory 103a.

The above configuration can correct the defocus blur shape while suppressing a learning load and a stored data amount. The configuration may be modified such that a map of the shape designating information is generated from the defocus blur shape and the replacement area selected by the user using the shape designating tab 104a and the brush 104b, and the step S204 is executed. Shape designating information having a spatially different distribution will be described in detail in the second and subsequent embodiments.

Next follows a description of conditions for enhancing the effect of this embodiment. The input data may further include a luminance saturation map. The luminance saturation map indicates the luminance saturation pixel area in the image and has the same size as the image. The learning phase generates the luminance saturation map from the training image. The estimation phase generates the luminance saturation map from the captured image. Since there are false edges in the luminance saturated part that are different from the object structure due to the luminance saturation, the machine learning model has difficulties in distinguishing it from that having the edge, such as the defocus blur and focus position having high frequency components. The luminance saturation map allows the machine learning model to distinguish the defocus blur and the focus position having the high frequency components from the luminance saturation part, and enables highly accurate shape corrections. Defocus blurs having high frequency components are likely to occur when a PSF having a sharp peak such as a two-line blur is applied.

Input data may further include a defocus map. The defocus map is a map showing information on the defocus blurs applied to the object in the captured image. The learning phase converts the defocus amount corresponding to the defocus blur applied to the training image into a numerical value. For example, the focus plane may be set to 0, the direction away from the image pickup apparatus may be set to be negative, and the approaching direction may be set to be positive. The estimation phase acquires the defocus map of the captured image by capturing the parallax image, using DFD (Depth from Defocus), etc. The numerical value of the defocus map at this time corresponds to the numerical value in the learning phase. The defocus map can correct shapes of the object at the in-focus position and the defocus blurs with high accuracy. If there is no defocus map, the object at the in-focus position and the defocus blur having a high frequency component cannot be distinguished from each other, and the object at the in-focus position is blurred.

Input data may further include a state map. The state map is information in which the state of the optical system 102a during imaging is represented by (Z, F, D). In (Z, F, D), Z corresponds to a zoom position, F corresponds to F-number, and D corresponds to a focal length.

The input data may further include a position map. The position map is a map showing an image plane coordinate for each pixel on the image. The position map may be a polar coordinate system (corresponding to image height and azimuth).

Defocus blur varies depending on the lens state, image height, and azimuth. Since CNN is learned so as to averagely correct all defocus blur shapes included in the learning data, the correction accuracy to each different defocus blur shape decreases. Accordingly, the machine learning model can specify the PSF applied to the captured image by inputting the state map and the position map to the machine learning model. Thereby, in the learning phase, the machine learning model learns weights for a different correction for each blur shape, rather than weights for averagely correcting defocus blur shapes even if the training images for learning do not contain a variety of defocus blur shapes. Thereby, in the estimation phase, each defocus blur shape can be highly accurate corrected. Hence, this embodiment can collectively learn the learning data for correcting a variety of defocus blur shapes while suppressing the reduction in shape correcting accuracy.

Second Embodiment

Figure 10:
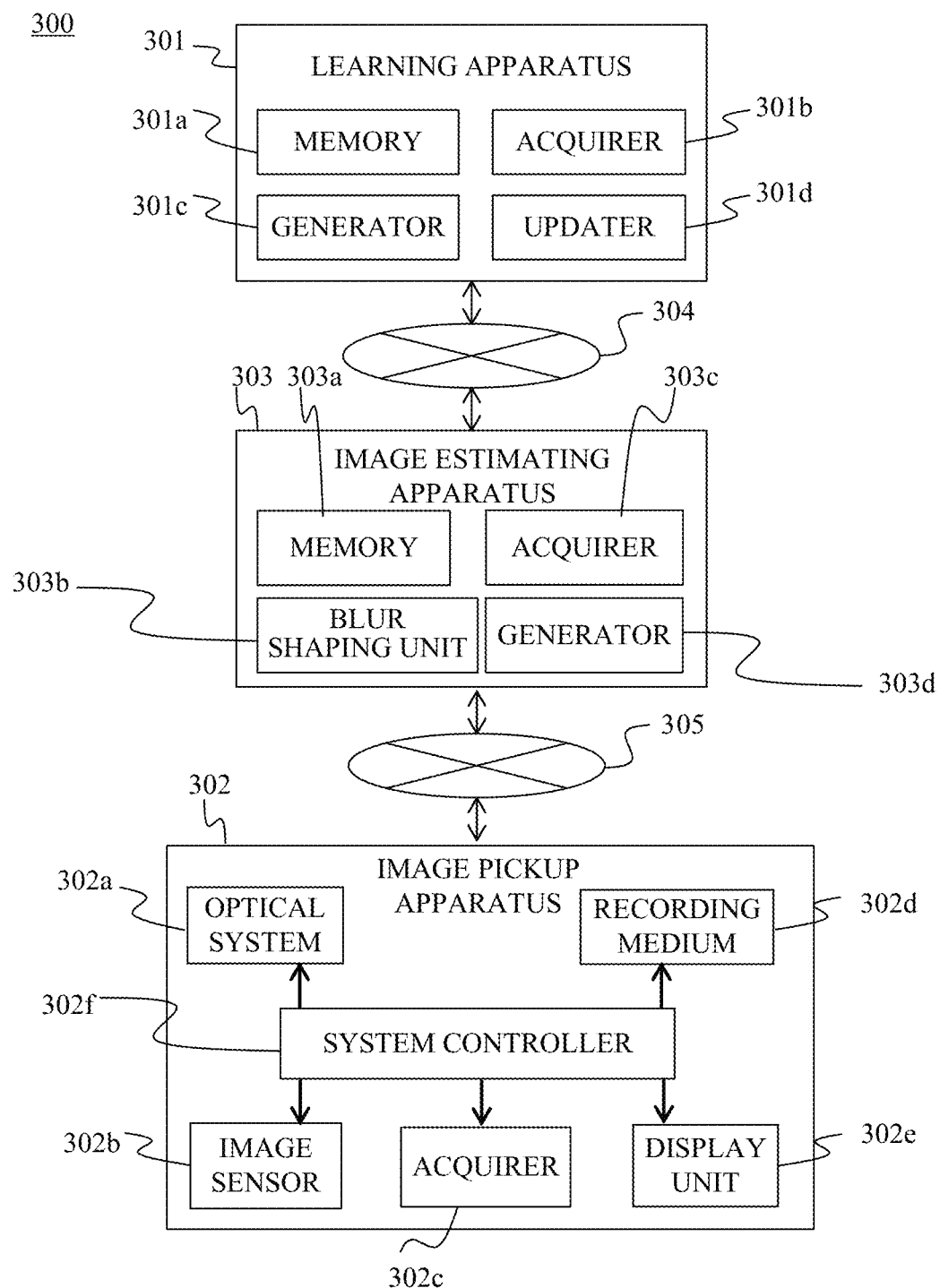
FIG. 10 is a block diagram of an image processing system according to the second embodiment.
Figure 11:
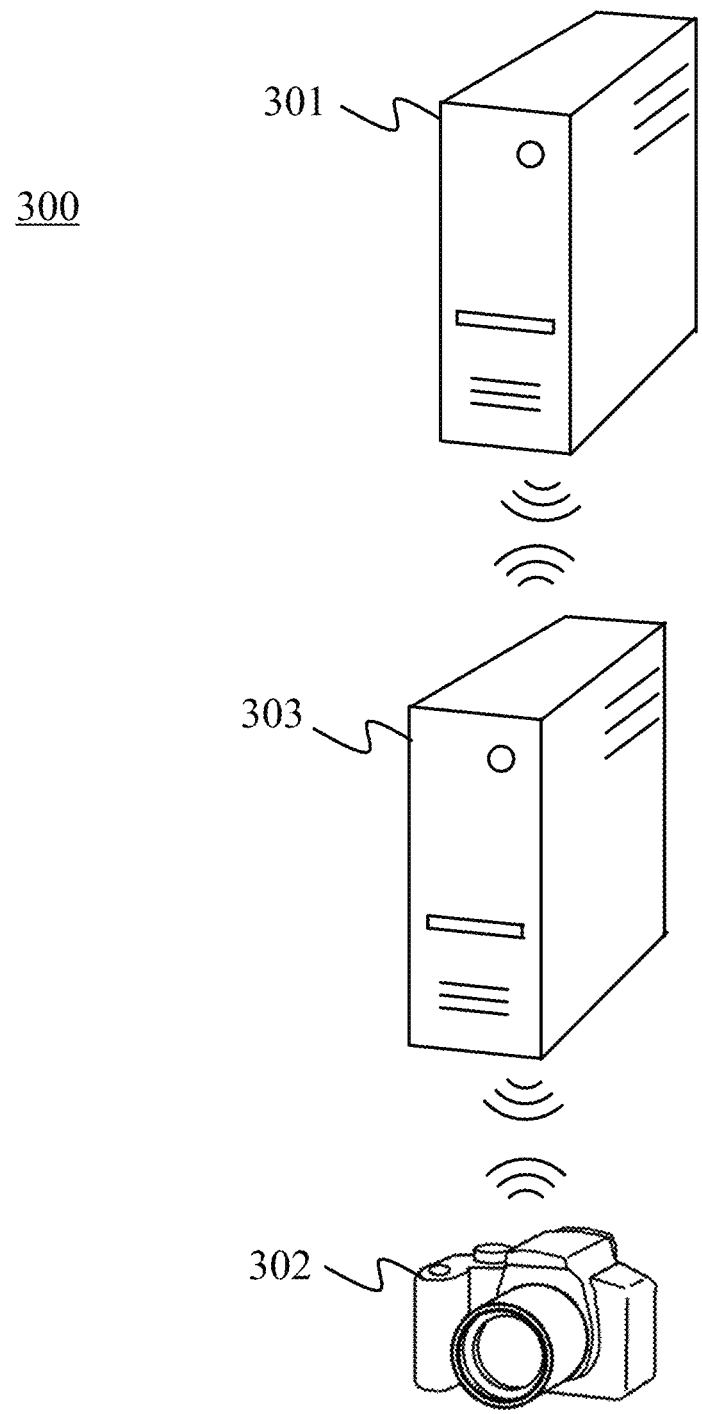
FIG. 11 is an external view of the image processing system according to the second embodiment.

Referring now to FIGS. 10 and 11, a description will be given of an image processing system according to a second embodiment of the present invention. FIG. 10 is a block diagram of an image processing system 300 according to this embodiment. FIG. 11 is an external view of the image processing system 300.

The image processing system 300 has a learning apparatus 301, an image pickup apparatus 302, an image estimating apparatus 303, and networks 304 and 305. The learning apparatus 301 has a memory 301a, an acquirer 301b, a generator 301c, and an updater 301d, and learns weights for a machine learning model used to correct defocus blur shapes. Details of weight learning and defocus blur correction using the weights will be described later.

The image pickup apparatus 302 has an optical system 302a, an image sensor 302b, an acquirer 302c, a recording medium 302d, a display unit 302e, and a system controller 302f. The optical system 302a collects light incident from the object space and forms an optical image (object image). The image sensor 302b converts an optical image into an electric signal by a photoelectric conversion and generates a captured image.

The image estimating apparatus (image processing apparatus) 303 includes a memory 303a, a blur shaping unit (blur shape corrector or generator) 303b, an acquirer 303c, and a generator 303d. The image estimating apparatus 303 generates an estimated image in which defocus blur shape is corrected in the (at least part of) captured image captured by the image pickup apparatus 302. The information of the learned weights learned by the learning apparatus 301 is used to generate the estimated image. The weight information is stored in the memory 303a. The acquirer 302c acquires the estimated image, and the recording medium 302d stores the estimated image. The system controller 302f controls a series of operations of the image pickup apparatus 302.

Figure 12:
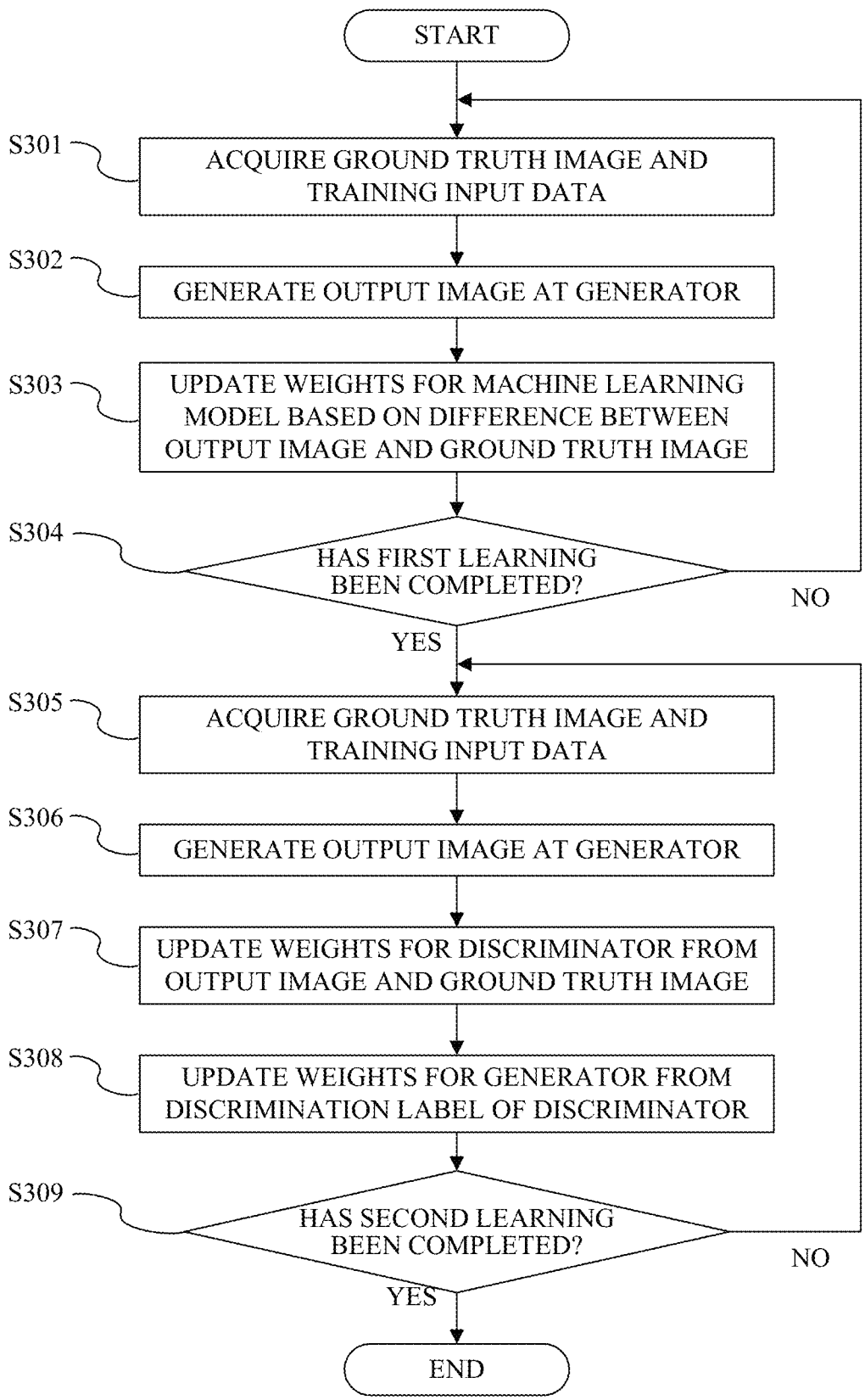
FIG. 12 is a flowchart for weight learning according to the second embodiment.

Referring now to FIG. 12, a description will be given of the weight learning (learning phase) performed by the learning apparatus 301. FIG. 12 is a flowchart for the weight learning (learned model manufacturing method). Each step in FIG. 12 is mainly executed by each unit in the learning apparatus 301. This embodiment uses GAN for the machine learning model, but may similarly apply another model. GAN is an adversatively generated network including a generator that generates an image and a discriminator that identifies the generated image. In this embodiment, a description of the same elements as those in the first embodiment will be omitted.

Figure 9:
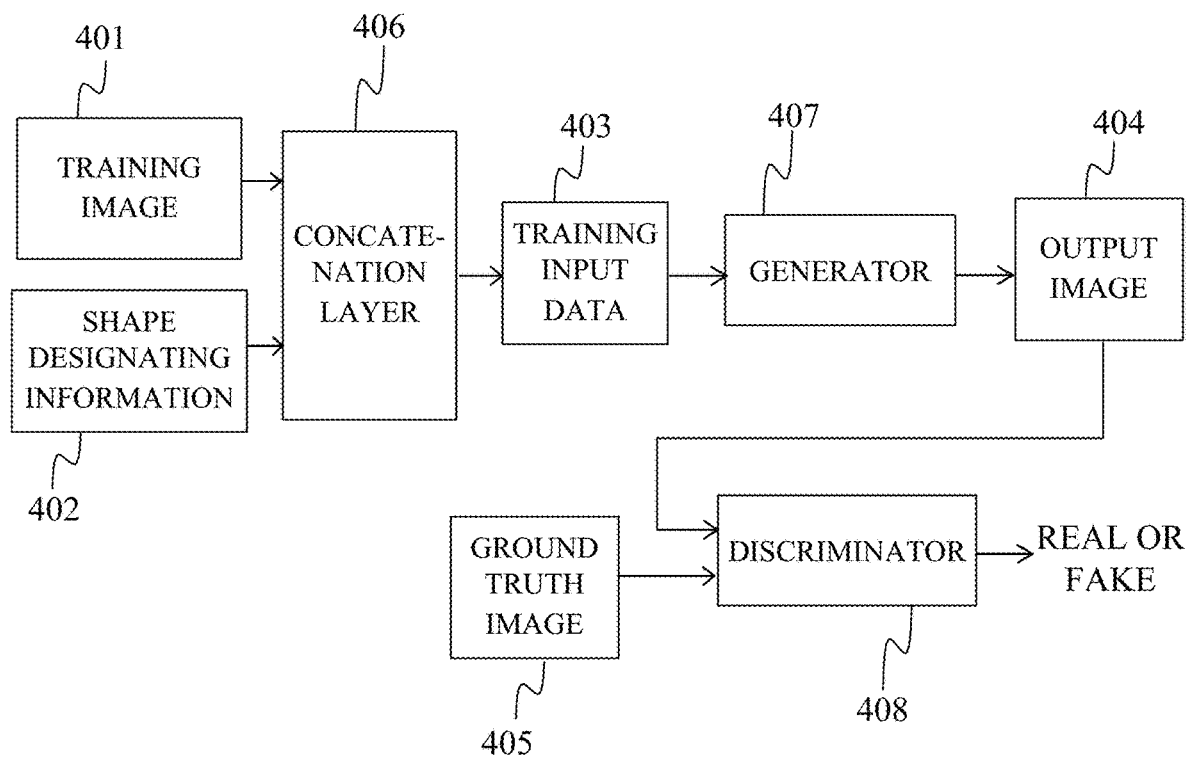
FIG. 9 illustrates a configuration of a machine learning model according to the second embodiment.

First, in the step S301, the acquirer 301b acquires one or more sets of ground truth image and training input data from the memory 301a. The generation of the ground truth image and the training image is the same as that in the first embodiment. Referring now to FIG. 9, a description will be given of generating the training input data according to this embodiment. FIG. 9 illustrates a configuration of GAN as a machine learning model. A concatenation layer 406 connects a training image 401 and shape designating information 402 in the channel direction in predetermined order to generate training input data 403.

Next, in the step S302 in FIG. 10, the generator 301c inputs the training input data 403 into a generator 407 and generates an output image 404. The generator 407 is, for example, CNN. Next, in the step S303, the updater 301d updates the weight of the generator 407 from the error or difference between the output image 404 and a ground truth image 405. A Euclidean norm of the difference at each pixel is used for the loss function. Next, in the step S304, the updater 301d determines whether the first learning has been completed. If the first learning has not yet completed, the flow returns to the step S301. On the other hand, when the first learning has been completed, the flow proceeds to the step S305, and second learning is executed.

Next, in the step S305, the acquirer 301b acquires one or more sets of ground truth image 405 and the training input data 403 from the memory 301a, as in the step S301. Next, in the step S306, the generator 301c inputs the training input data 403 into the generator 407 and generates the output image 404, as in the step S302.

In the step S307, the updater 301d updates the weight for a discriminator 408 from the output image 404 and the ground truth image 405. The discriminator 408 discriminates whether the input image is a fake image generated by the generator 407 or a real image that is the ground truth image 405. The output image 404 or the ground truth image 405 is input to the discriminator 408 to generate a discrimination label (fake or real). The weight for the discriminator 408 is updated based on the error or difference between the discrimination label and the ground truth label (the output image 404 is fake and the ground truth image 405 is real). Although sigmoid cross entropy is used for the loss function, another loss function may be used.

Next, in the step S308, the updater 301d updates the weight for the generator 407 from the output image 404 and the ground truth image 405. The loss function is the weighted sum of the Euclidean norm in the step S303 and the following two terms. The first item is a term called Content Loss, which is the Euclidean norm of the difference for each element between the output image 404 and the ground truth image 405 after they are converted into a feature map. By adding the difference in the feature map to the loss function, the more abstract nature of the output image 404 can be made closer to the ground truth image 405. The second item is sigmoid cross entropy of the discrimination label obtained by inputting the output image 404 to the discriminator 408, which is called an adversarial loss. Learning such that the discriminator 408 can discriminate fake and real from each other can provide the output image 404 that more objectively looks like the ground truth image 405.

Next, in the step S309, the updater 301d determines whether or not the second learning has been completed. Similar to the step S304, if the second learning has not yet completed, the flow returns to the step S305. On the other hand, when the second learning has been completed, the weight information for the learned generator 407 is stored in the memory 301a.

Figure 13:
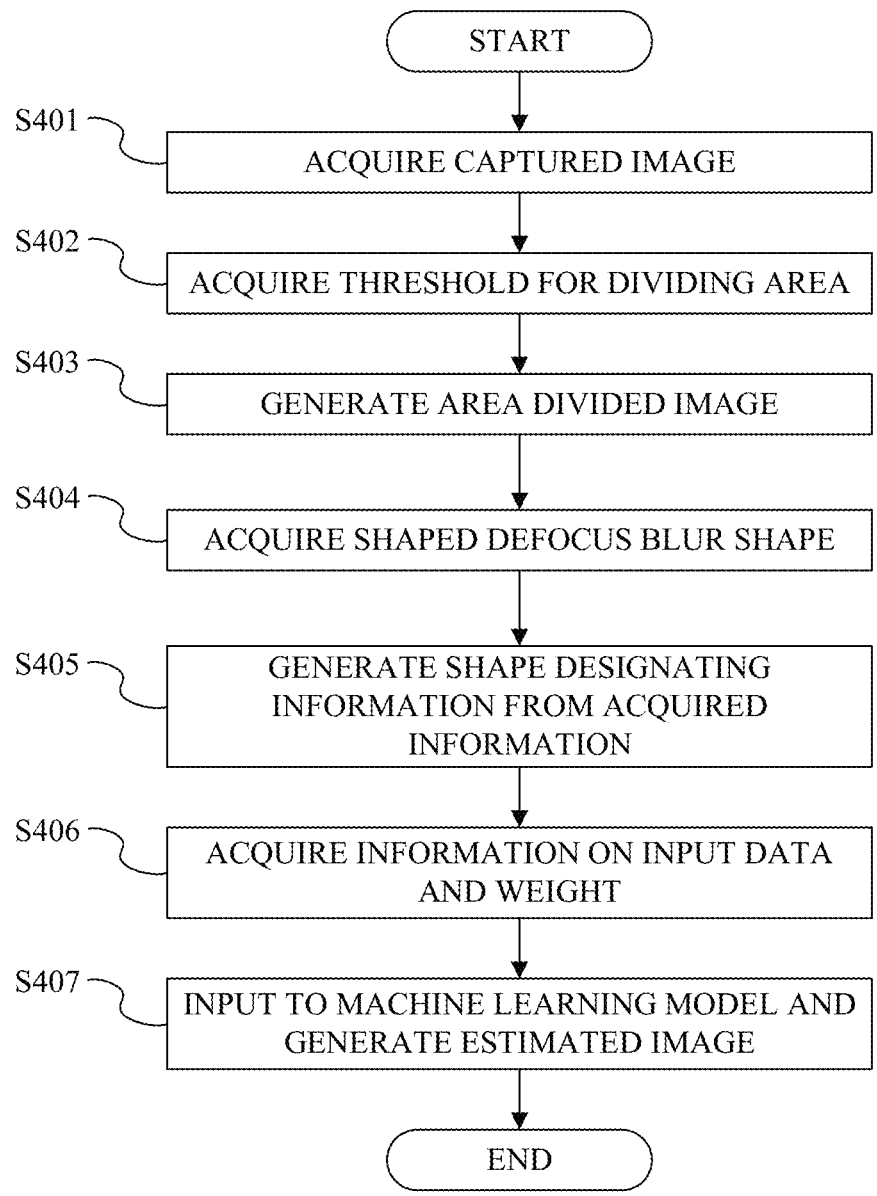
FIG. 13 is a flowchart for generating an estimated image according to the second embodiment.
Figure 14:
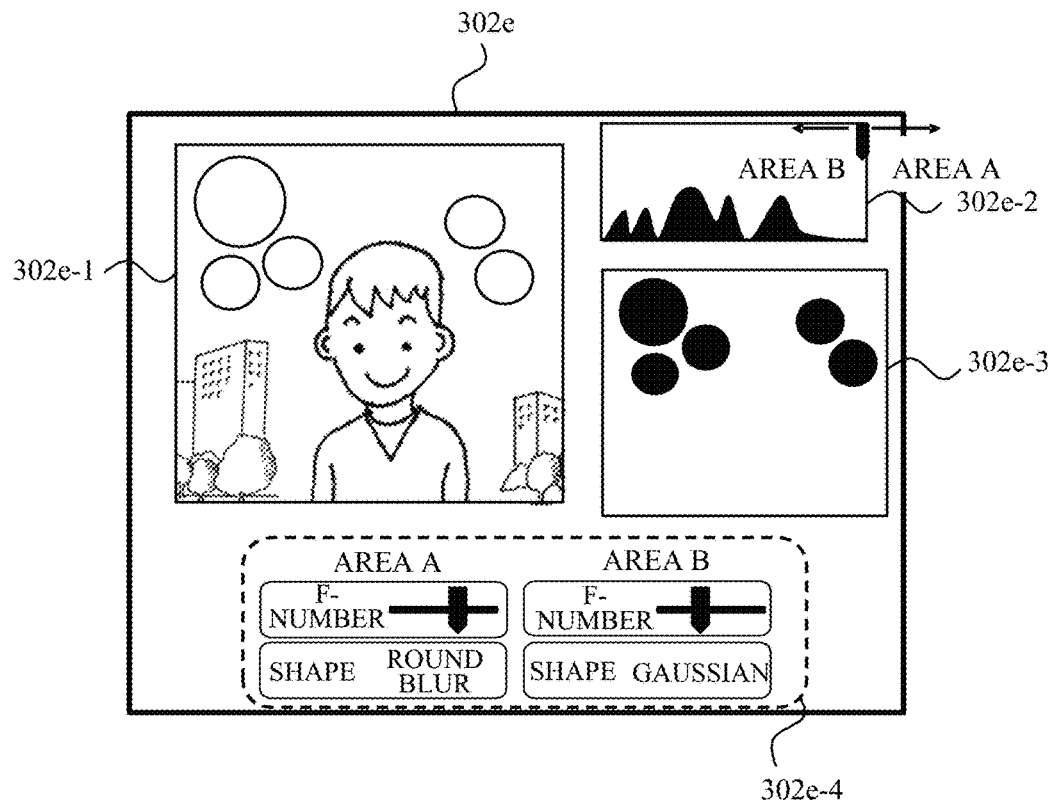
FIG. 14 illustrates a user interface according to the second embodiment.

Referring now to FIGS. 13 and 14, a description will be given of a defocus blur shape correction (estimation phase) executed by the image estimating apparatus 303 and a user interface. FIG. 13 is a flowchart for generating an estimated image in this embodiment. FIG. 14 illustrates the user interface according to this embodiment. In this embodiment, the user can correct the defocus blur shape by designating a threshold, by dividing an area in the captured image, and by designating the defocus blur shape for each divided area.

As illustrated in FIG. 14, the display unit 302e displays a captured image 302e-1, a luminance value histogram 302e-2, an area divided image 302e-3, and a defocus blur shape designating tab 302e-4. The captured image 302e-1 in this embodiment has a person at an in-focus position, and the high luminance object and other objects in the background are defocused.

First, in the step S401 in FIG. 13, the acquirer 303c acquires (at least part of) captured image. Next, in the step S402, the acquirer 303c acquires the threshold designated by the user by viewing the histogram 302e-2 in the captured image 302e-1. Next, in the step S403, the generator 303d generates the area divided image 302e-3 based on the acquired threshold. For example, for a captured image having a luminance value from 0 to 255, assume an area A has luminance values from 250 to 255, and an area B has luminance values from 0 to 250. Thereby, the high luminance object and other objects in the background can be divided. No area division is necessary when the defocus blur shapes are uniformly corrected throughout the image.

Next, in the step S404, the acquirer 303c acquires the corrected defocus blur shape designated by the user on the defocus blur shape designating tab 302e-4. The shape is designated for each divided area in the step S403. The designating information includes the size and type. The size is designated as F1.0 or F2.0. For the type, a variety of defocus blur shapes are designated such as a Gaussian blur and a round blur. For example, the area A is designated as an F1.0 round blur and the area B is designated as an F2.0 Gaussian blur.

Next, in the step S405, the generator 303d generates shape designating information based on the acquired area dividing information and information that designates the corrected defocus blur shape. Next, in the step S406, the acquirer 303c acquires the input data and the learned weight information. The input data includes a captured image and shape designating information. The weight information is read in advance out of the memory 301a and stored in the memory 303a.

Next, in the step S407, the blur shaping unit 303b inputs the input data to CNN and generates an estimated image. In the step S404, when the area A is designated as the F1.0 round blur and the area B is designated as the F2.0 Gaussian blur, an estimated image is generated in which the defocus blur shape in the captured image 302e-1 is corrected into the designated shape.

The above configuration can correct the defocus blur shape into a variety of shapes while suppressing the learning load and the stored data amount.

Third Embodiment

Figure 16:
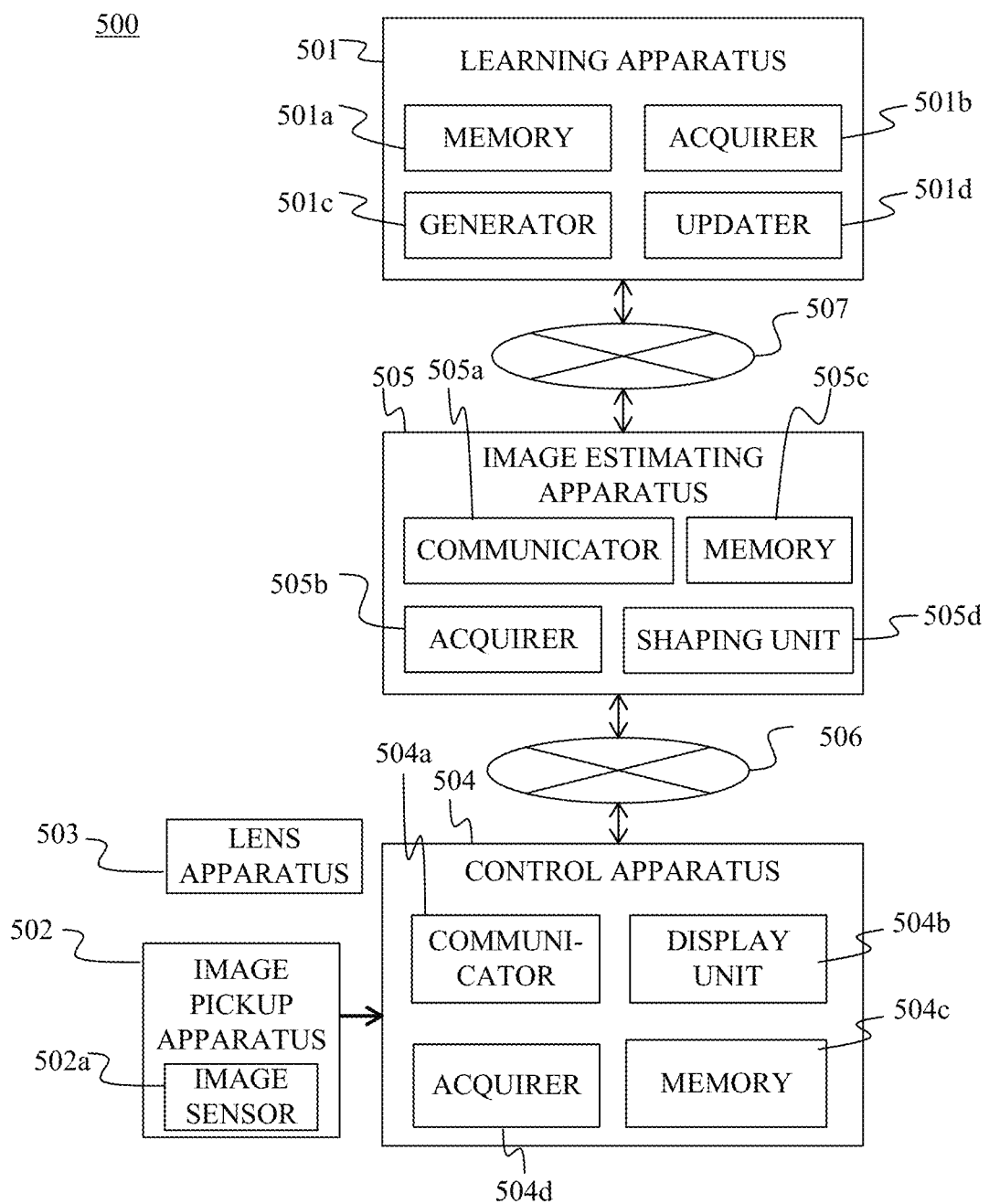
FIG. 16 is a block diagram of an image processing system according to the third embodiment.
Figure 17:
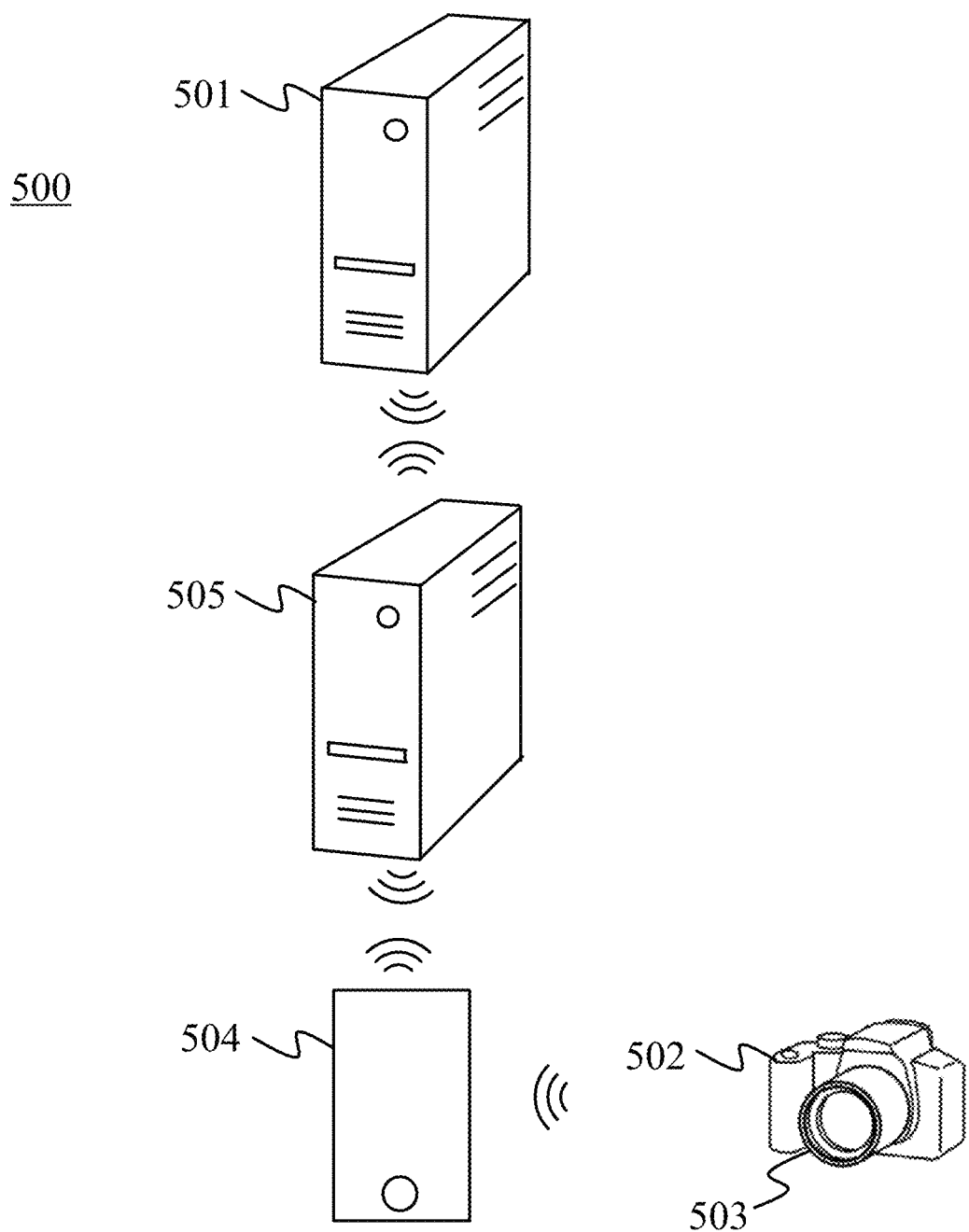
FIG. 17 is an external view of the image processing system according to the third embodiment.

Referring now to FIGS. 16 and 17, a description will be given of an image processing system according to a third embodiment of the present invention. FIG. 16 is a block diagram of an image processing system 500 according to this embodiment. FIG. 17 is an external view of the image processing system 500.

The image processing system 500 includes a learning apparatus 501, an image pickup apparatus 502, a lens apparatus 503, a control apparatus (first apparatus) 504, an image estimating apparatus (second apparatus) 505, and networks 506 and 507. The control apparatus 504 and the image estimating apparatus 505 can communicate with each other via the network 506. The learning apparatus 501 and the image estimating apparatus 505 can communicate with each other via the network 507. The learning apparatus 501 and the image estimating apparatus 505 include, for example, servers. The control apparatus 504 includes a user terminal (smartphone, tablet, etc.). The learning apparatus 501 includes a memory 501a, an acquirer 501b, a generator 501c, and an updater 501d, and learns weights for a machine learning model used to correct the defocus blur shape in a captured image captured using the image pickup apparatus 502. Details regarding learning will be described later.

The image pickup apparatus 502 has an image sensor 502a, and the image sensor 502a photoelectrically converts the optical image formed by the lens apparatus 503 to obtain a captured image. The lens apparatus 503 can be attached to and detached from the image pickup apparatus 502, and the lens apparatus 503 and the image pickup apparatus 502 can be combined with plural types. The control apparatus 504 includes a communicator 504a, a display unit 504b, a memory 504c, and an acquirer 504d, and controls processes for the captured image acquired from the image pickup apparatus 502 connected by wire or wirelessly according to the operation of the user. Alternatively, the captured image captured by the image pickup apparatus 502 may be stored in the memory 504c in advance and the stored captured image may be read out.

The image estimating apparatus 505 includes a communicator 505a, an acquirer (acquirer) 505b, a memory 505c, and a shaping unit (shape corrector or generator) 505d. The image estimating apparatus 505 executes the defocus blur correction processing to the captured image in response to a request from the control apparatus 504 connected via the network 506. The image estimating apparatus 505 acquires the learned weight information from the learning apparatus 501 connected via the network 507 before or during the defocus blur correction, and uses it for the defocus blur correction to the captured image. The estimated image after the defocus blur shape correction is transmitted to the control apparatus 504 again, stored in the memory 504c, and displayed on the display unit 504b.

Next follows a description of the weight learning (learning phase) performed by the learning apparatus 501. The input method of the shape designating information in this embodiment is different from that in the first embodiment. Each step of the flowchart for the weight learning is the same as that in FIG. 5.

Figure 15:
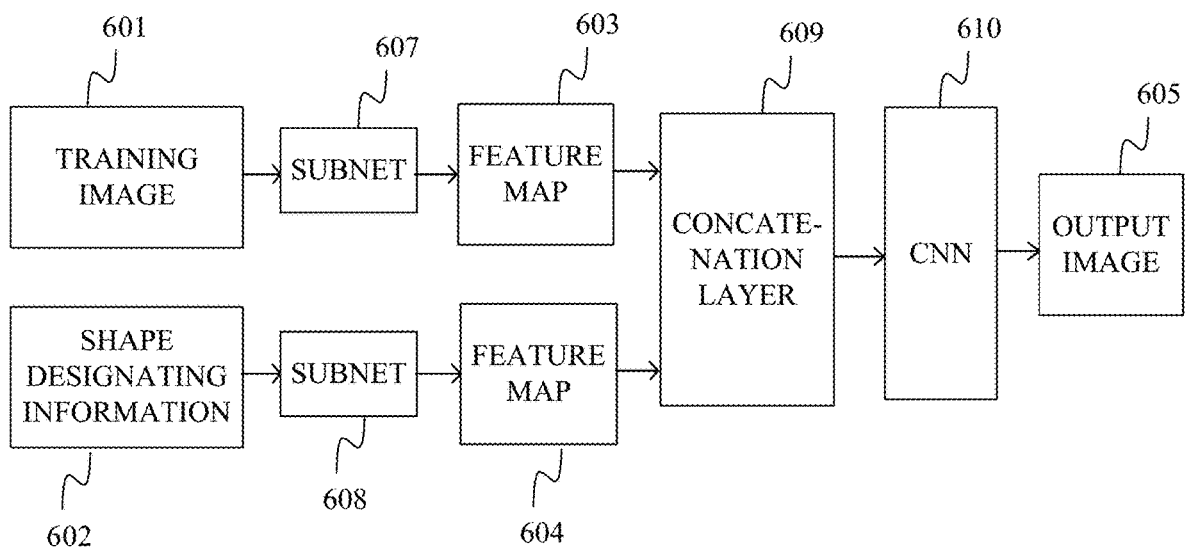
FIG. 15 illustrates a configuration of a machine learning model according to the third embodiment.

A method of inputting the shape designating information will be described with reference to FIG. 15. FIG. 15 illustrates a configuration of the machine learning model according to this embodiment. The training input data is a training image 601 and shape designating information 602. The training image 601 and the shape designating information 602 are converted into feature maps 603 and 604 using subnetworks 607 and 608, respectively. A concatenation layer 609 connects the feature maps 603 and 604 in the channel direction in predetermined order. CNN 610 inputs the concatenated feature maps 603 and 604 and generates an output image 605.

Figure 18:
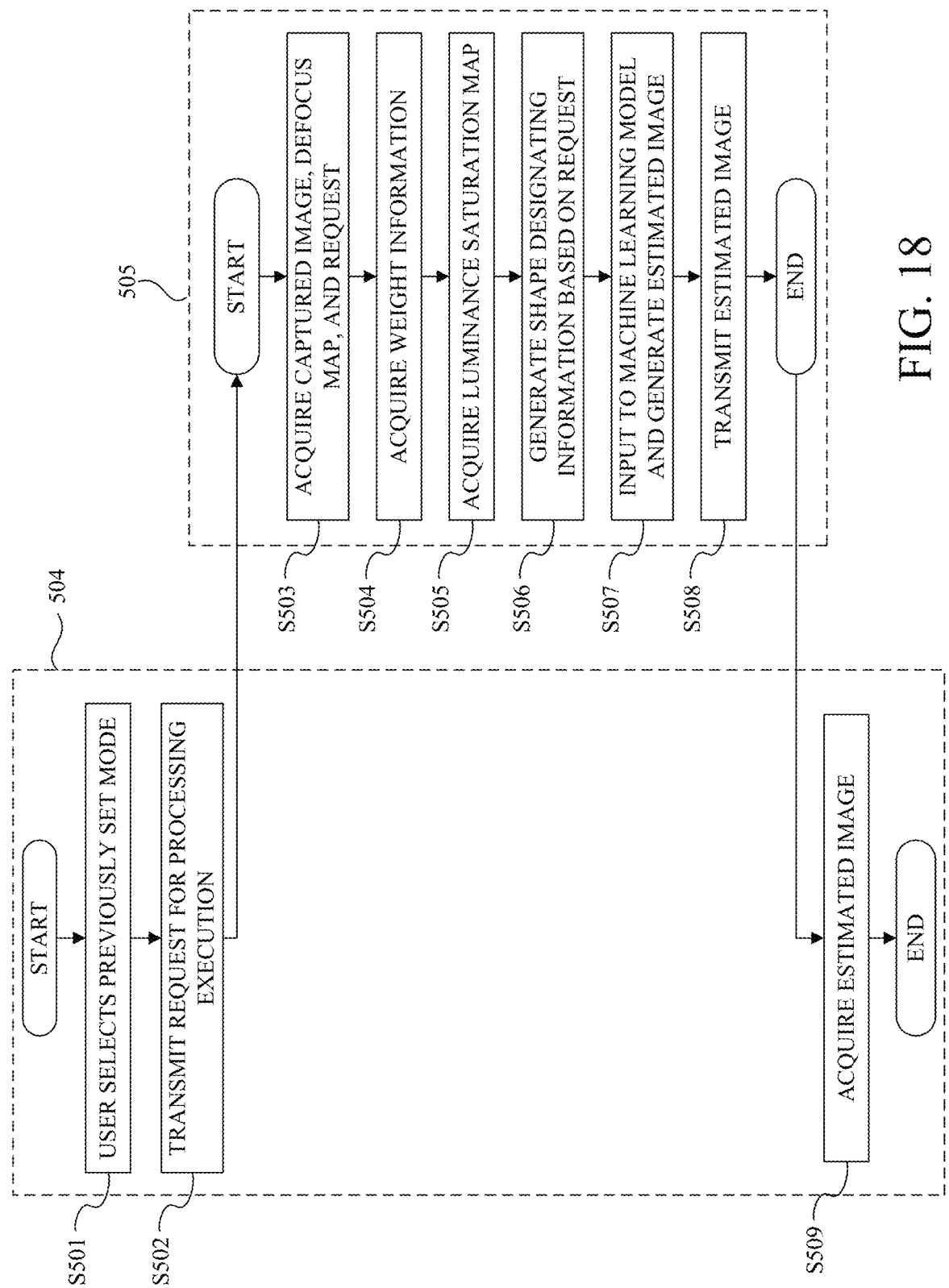
FIG. 18 is a flowchart for generating an estimated image according to the third embodiment.
Figure 19:
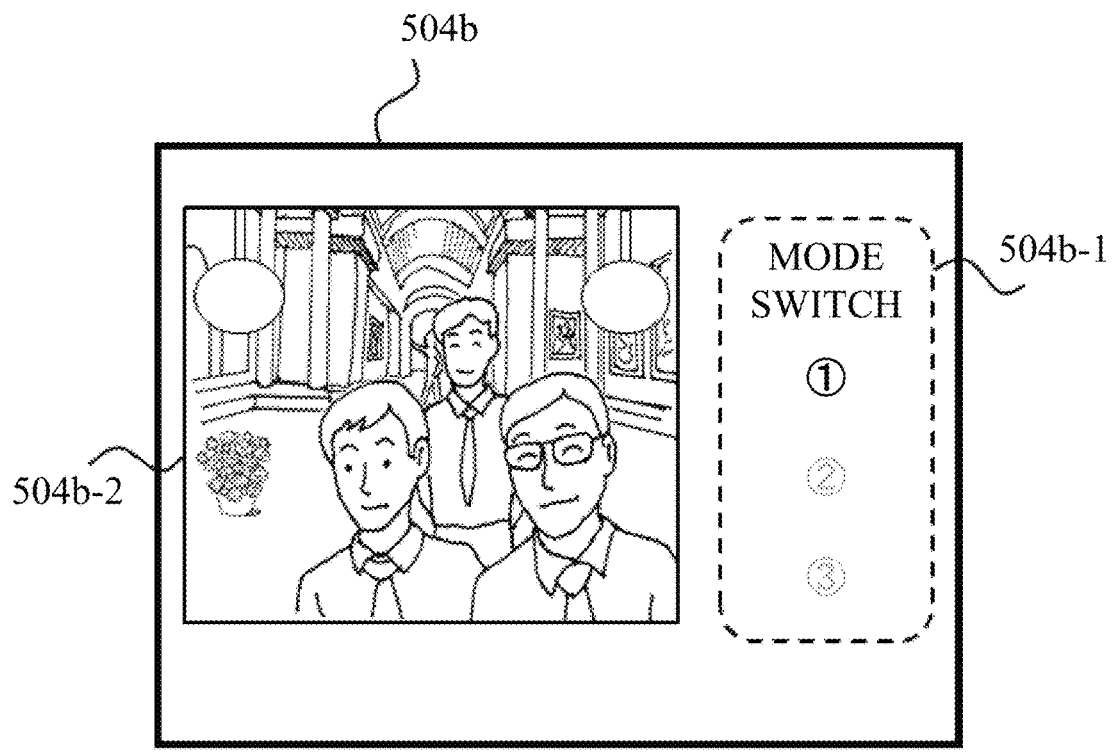
FIG. 19 illustrates a user interface according to the third embodiment.

Referring now to FIGS. 18 and 19, a description will be given of a defocus blur correction (estimation phase) of a captured image executed by the control apparatus 504 and the image estimating apparatus 505 and a user interface in this embodiment. FIG. 18 is a flowchart for generating an estimated image according to this embodiment. Each step in FIG. 18 is mainly executed by each unit in the image estimating apparatus 505. FIG. 19 illustrates the user interface according to this embodiment.

In this embodiment, the user can correct the defocus blur shape in the captured image by selecting the preset mode. As illustrated in FIG. 19, the display unit 504b displays a mode selection tab 504b-1 and a captured image 504b-2. The captured image 504b-2 in this embodiment has three persons at the in-focus position and the background is defocused.

First, in the step S501 in FIG. 18, the acquirer 504d acquires information selected by the user on the mode selection tab 504b-1. For example, three selectable modes are set in advance which includes (1) all Gaussian blurs (F-number of 1.0), (2) all round blurs (F-number of 2.0), (3) the luminance saturated part is round blurred and other parts are Gaussian blurred (F-number of 1.0). The mode selection corresponds to the selection of the shape designating information. Another mode may be set in which the area is divided according to the defocus amount of the defocus map, and the F-number is made lower in an area having a larger defocus amount. This structure can create an image that emphasizes a sense of distance.

Next, in the step S502, the communicator (transmitter) 504a sends a request to the image estimating apparatus 505 to generate a captured image, a defocus map, selected mode information, and an estimated image (which is a request for processing execution for the captured image). The defocus map can be generated by the method described in the first embodiment.

Next, in the step S503, the communicator 505a receives and acquires the request for the transmitted captured image, defocus map, mode information, and processing. Next, in the step S504, the acquirer 505b acquires the learned weight information from the memory 505c. The weight information is read out of the memory 501a in advance and stored in the memory 505c. Next, in the step S505, the acquirer 505b acquires a luminance saturation map from the captured image.

Next, in the step S506, the shaping unit 505d generates shape designating information from the selected mode information. The luminance saturation map or defocus map may be used to generate the shape designating information. When the luminance saturation map or the defocus map is used, the object area can be extracted, and the shape designating information has a spatial distribution. However, if the object area is extracted only by the luminance saturation map or the defocus map, a defect may occur in the object area. For example, in an attempt to extract a light source area such as a streetlamp with a luminance saturation map, part of the luminance may not be saturated due to the uneven luminance of the light source or the applied defocus blur distribution. In that case, the opening processing can be used to fill the defect in the area. Therefore, the opening processing may be used to extract the object area.

Next, in the step S507, the shaping unit 505d inputs the input data to CNN and generates an estimated image in which the defocus blur shape in the captured image is corrected. The input data includes a captured image and shape designating information. In the step S501, when (1) all Gaussian blur (F-number of 1.0) is selected, the defocus blur shape in the captured image 504b-2 can be corrected into an estimated image having a corrected F1.0 Gaussian blur. Next, in the step S508, the communicator 505a transmits the estimated image to the control apparatus 504.

Next, in the step S509, the communicator 504a acquires the transmitted estimated image and saves it in the memory 504c. Alternatively, in the step S502, a request to generate all of captured images and estimated images in preset selectable modes may be transmitted, and the plurality of estimated images generated in subsequent steps may be stored in the memory 505c. When the user selects the mode, the corresponding estimated image is transmitted to the control apparatus 504.

The above configuration can correct the defocus blur shape into a variety of shapes while suppressing the learning load and the stored data amount.

Fourth Embodiment

Figure 21:
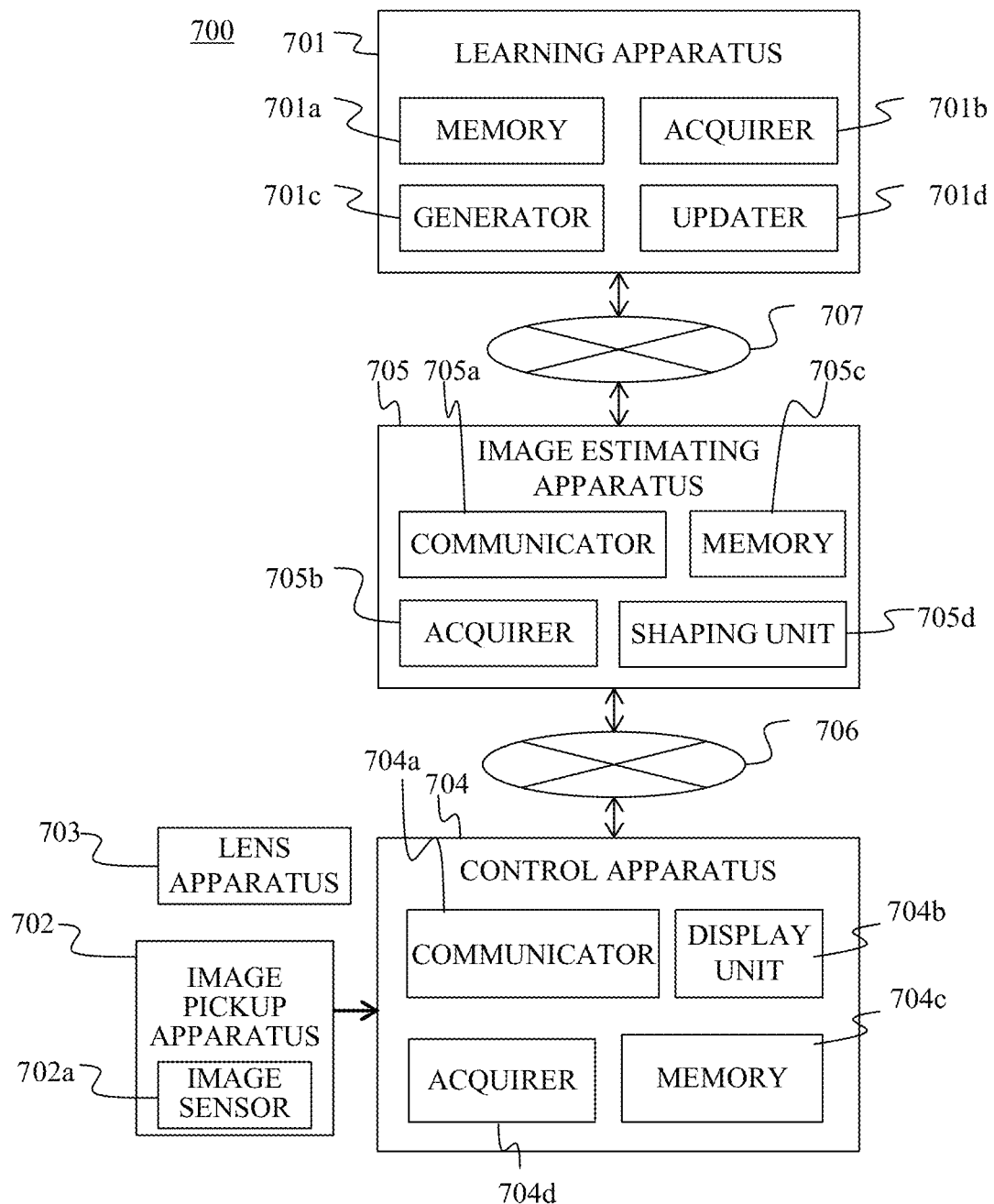
FIG. 21 is a block diagram of an image processing system according to the fourth embodiment.
Figure 22:
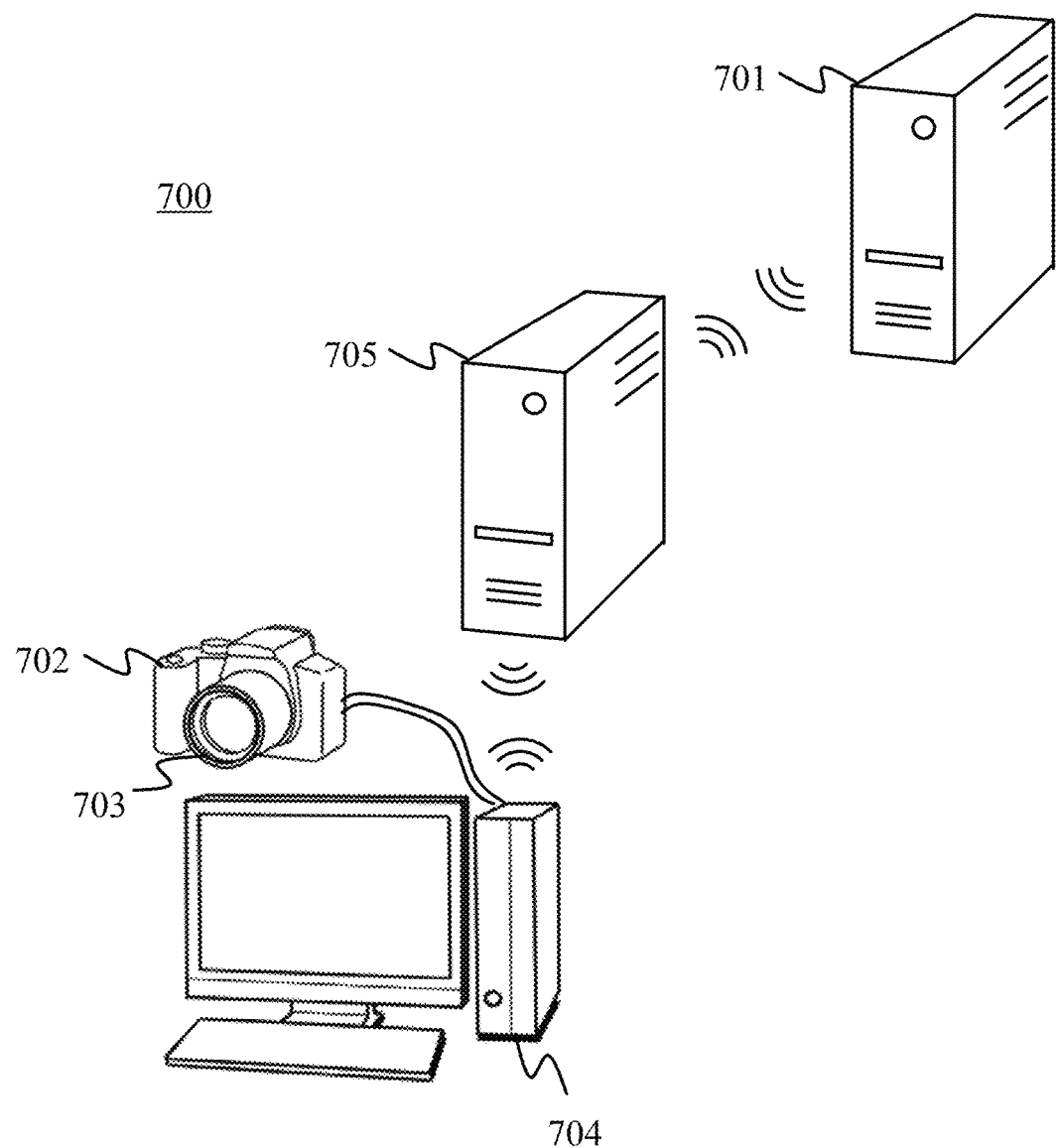
FIG. 22 is an external view of the image processing system according to the fourth embodiment.

Referring now to FIGS. 21 and 22, a description will be given of an image processing system according to a fourth embodiment of the present invention. FIG. 21 is a block diagram of an image processing system 700. FIG. 22 is an external view of the image processing system 700.

The image processing system 700 includes a learning apparatus 701, an image pickup apparatus 702, a lens apparatus 703, a control apparatus (first apparatus) 704, an image estimating apparatus (second apparatus) 705, and networks 706 and 707. The learning apparatus 701 includes a memory 701a, an acquirer 701b, a generator 701c, and an updater 701d. The image pickup apparatus 702 has an image sensor 702a. The control apparatus 704 has a communicator 704a, a display unit 704b, a memory 704c, and an acquirer 704d. The image estimating apparatus 705 includes a communicator 705a, an acquirer 705b, a memory 705c, and a shaping unit (shape corrector or generator) 705d. Since the configuration and operation of each component in the image processing system 700 are the same as those of the image processing system 500 according to the third embodiment, a description thereof will be omitted. In this embodiment, a personal computer is used for the user terminal.

Next follows a description of the weight learning (learning phase) performed by the learning apparatus 701. This embodiment differs from the first embodiment in method of inputting the shape designating information. The other steps are common.

Figure 20:
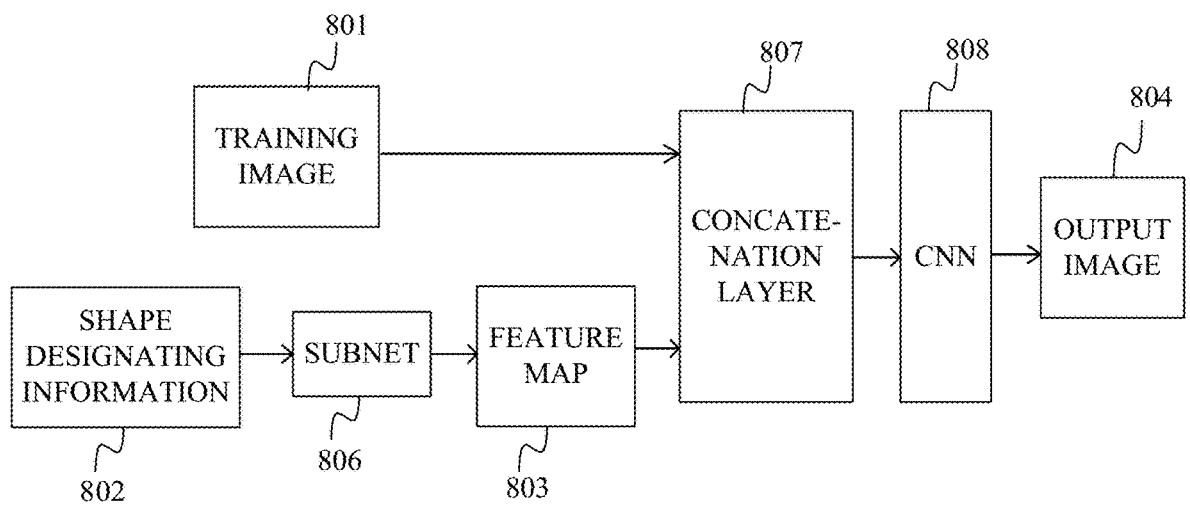
FIG. 20 illustrates a configuration of a machine learning model according to the fourth embodiment.

A method of inputting shape designating information will be described with reference to FIG. 20. FIG. 20 illustrates a configuration of the machine learning model according to this embodiment. The training input data includes a training image 801 and shape designating information 802. In this embodiment, the shape designating information 802 is converted into a feature map 803 using a subnetwork 806. The concatenation layer 807 concatenates the training image 801 and the feature map 803 in the channel direction in predetermined order. The CNN 808 inputs the concatenated training image 801 and feature map 803, and generates an output image 804.

Figure 23:
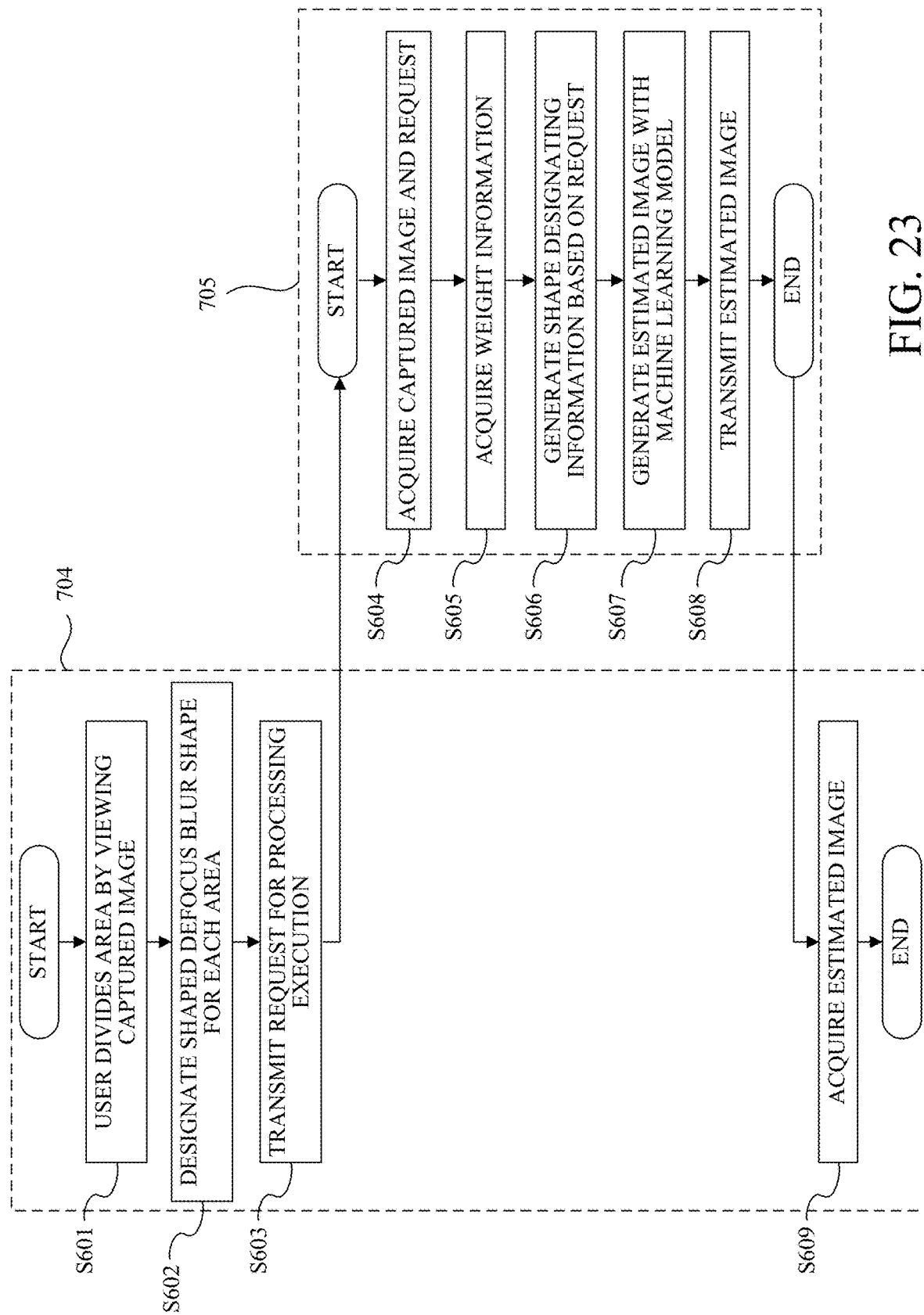
FIG. 23 is a flowchart for generating an estimated image according to the fourth embodiment.
Figure 24:
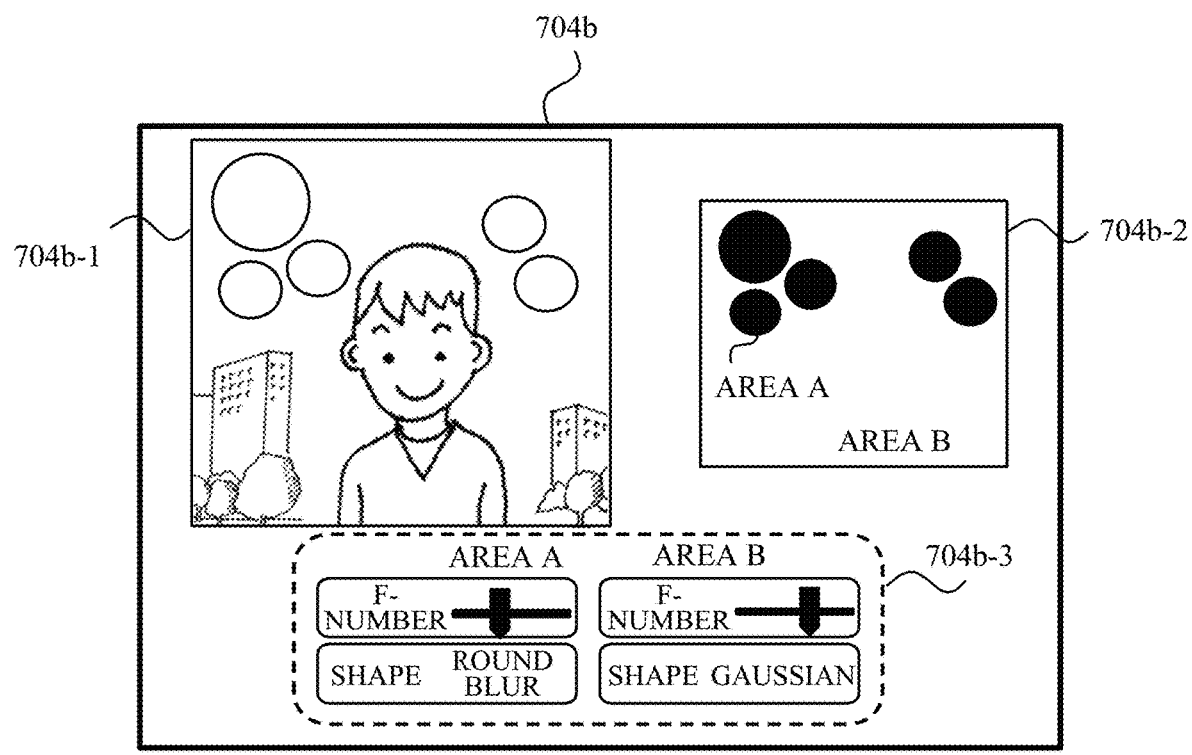
FIG. 24 illustrates a user interface according to the fourth embodiment.

Referring now to FIGS. 23 and 24, a description will be given of a defocus blur correction (estimation phase) to the captured image executed by the control apparatus 704 and the image estimating apparatus 705 and the user interface. FIG. 23 is a flowchart for generating an estimated image according to this embodiment. Each step in FIG. 23 is mainly executed by each unit in the image estimating apparatus 705. FIG. 24 illustrates the user interface according to this embodiment.

In this embodiment, the user can correct the defocus blur shape by dividing the captured image into areas with a cursor or the like, and by designating the defocus blur shape for each divided area. As illustrated in FIG. 24, the display unit 704b displays a captured image 704b-1, an area divided image 704b-2, and a defocus blur shape designating tab 704b-3. The captured image 704b-1 according to this embodiment has a person at the in-focus position, and the high luminance object and other objects in the background are defocused.

First, in the step S601 in FIG. 23, the acquirer 704d acquires area dividing information designated by the user and divides the captured image into areas. The user designates the area dividing information for the captured image while viewing the display unit 704b. For example, when he would like to extract the area A, the user roughly selects the area around the area A with a cursor or the like. Next, he acquires the area A from the roughly selected area by using the luminance saturation map or the defocus map. When the area to be acquired (extracted) is the luminance saturated part, the luminance saturation map is used. If the area to be acquired is a specific object area, the defocus map is used. In acquiring a luminance saturated area, the luminance saturation map is used because the defocus map may include an area other than the luminance saturated part. Such a map is used because it is difficult for the user to designate the area with high accuracy using a cursor or the like.

Next, in the step S602, the acquirer 704d acquires information on the corrected defocus blur shape designated by the user. This is designated by the user for each divided area using the blur shape designating tab 704b-3. For example, the area A is designated as an F1.4 round blur and the area B is designated as an F2.8 Gaussian blur. Next, in the step S603, the communicator (transmitter) 704a sends to the image estimating apparatus 705 a captured image, a request to generate an estimated image (a request for a processing execution for the captured image), area dividing information, and information on corrected defocus blur shape.

Next, in the step S604, the communicator 705a receives and acquires the transmitted captured image, processing request, area dividing information, and information on the corrected defocus blur shape. Next, in the step S605, the acquirer 705b acquires the learned weight information from the memory 705c. The weight information is read in advance out of the memory 701a and stored in the memory 705c. Next, in the step S606, the shaping unit (shape corrector or generator) 705d generates shape designating information based on the area dividing information and the information on the corrected defocus blur shape. Next, in the step S607, the shaping unit 705d inputs the input data into CNN and generates an estimated image in which the defocus blur shape has been corrected. In the step S602, when the area A is designated as an F1.4 round blur and the area B is designated as an F2.8 Gaussian blur, an estimated image can be generated in which the defocus blur shape in the captured image 704b-1 has been corrected into a designated shape.

Next, in the step S608, the communicator 705a transmits the estimated image to the control apparatus 704. Then, in the step S609, the communicator 704a acquires the transmitted estimated image and stores it in the memory 704c.

The above configuration can correct the defocus blur shape into a variety of shapes while suppressing the learning load and the stored data amount.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Each embodiment can provide an image processing method that can correct a defocus blur shape in a captured image into a variety of shapes (according to user's preference) while suppressing increases in a learning load and a stored data amount of the machine learning model. Each embodiment can provide a non-transitory computer-readable storage medium, an image processing apparatus, an image processing system, and a learned model manufacturing method for obtaining the same effect.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-178047, filed on Sep. 27, 2019, which is hereby incorporated by reference herein in its entirety.

What is claimed is:

1. An image processing method for generating an estimated image in which a defocus blur shape of an object in a captured image is corrected, the image processing method comprising:
    a first step of acquiring input data including the captured image and shape designating information that designates a defocus blur shape of the object in the estimated image; and
    a second step of inputting the input data to a machine learning model to generate the estimated image in which the defocus blur shape of the object in the captured image is corrected to a desired defocus blur shape of the object.

2. The image processing method according to claim 1, wherein the shape designating information includes information that designates at least one of a size and type of a defocus blur.

3. The image processing method according to claim 2, wherein the size and type correspond to virtual lens parameters.

4. The image processing method according to claim 1, wherein the shape designating information is determined based on a signal value of the captured image.

5. The image processing method according to claim 4, wherein the shape designating information is determined based on a distribution of signal values of the captured image.

6. The image processing method according to claim 1, wherein the shape designating information is determined based on a defocus map of the captured image.

7. The image processing method according to claim 1, wherein the shape designating information has a spatial distribution.

8. The image processing method according to claim 1, wherein the shape designating information is a map of at least one channel, and indicates at least one of a size and type of a defocus blur with a numerical value, and
    wherein the numerical value is normalized.

9. The image processing method according to claim 1, further comprising a third step of acquiring information on a replaced area for the captured image and replacing the replaced area for the captured image with the estimated image.

10. The image processing method according to claim 9, wherein the replaced area is determined based on a signal value or a defocus map of the captured image.

11. The image processing method according to claim 1, wherein the input data further includes a defocus map or a luminance saturation map of the captured image.

12. The image processing method according to claim 1, wherein the machine learning model uses the same weight for first shape designating information for designating one of a size and type of a defocus blur, and second shape designating information for designating one of a size and type of the defocus blur different from the first shape designating information.

13. A non-transitory computer-readable storage medium storing a program for causing a computer to execute the image processing method according to claim 1.

14. An image processing apparatus comprising at least one processor or circuit configured to execute the image processing method according to claim 1.

15. A learned model manufacturing method comprising the steps of:
    acquiring a training image and a ground truth image having different blur shapes for the same object;
    acquiring shape designating information for designating a defocus blur shape of the object in the ground truth image; and
    learning at a machine learning model based on the training image, the ground truth image, and the shape designating information.

16. An image processing system comprising a first apparatus and a second apparatus that communicate with each other,
    wherein the first apparatus includes a transmitter configured to transmit to the second apparatus a request for a processing execution for a captured image, and
    wherein the second apparatus includes:
    a receiver configured to receive the request;
    an acquirer configured to acquire input data including the captured image and shape designating information for designating a defocus blur shape of an object in an estimated image; and
    a generator configured to input, according to the request, the input data to a machine learning model to generate the estimated image in which a defocus blur shape of the object in the captured image is corrected to a desired defocus blur shape of the object.

17. The image processing method according to claim 1, wherein the shape designating information corresponds to a difference between the defocus blur shape of the object in the captured image and the desired defocus blur shape of the object.

18. An image processing method for generating an estimated image in which a defocus blur shape in a captured image is corrected, the image processing method comprising:
    a first step of acquiring input data including the captured image and shape designating information that designates a defocus blur shape in the estimated image; and
    a second step of inputting the input data to a machine learning model and of generating the estimated image,
    wherein the shape designating information is determined based on a distribution of signal values of the captured image.

19. An image processing method for generating an estimated image in which a defocus blur shape in a captured image is corrected, the image processing method comprising:
    a first step of acquiring input data including the captured image and shape designating information that designates a defocus blur shape in the estimated image; and
    a second step of inputting the input data to a machine learning model and of generating the estimated image,
    wherein the shape designating information has a spatial distribution.

* * * * *